No. 829,505. PATENTED AUG. 28, 1906.
B. B. CARTER.
PRINTING PRESS.
APPLICATION FILED OCT. 26, 1905.
26 SHEETS—SHEET 13.
Fig. 33.
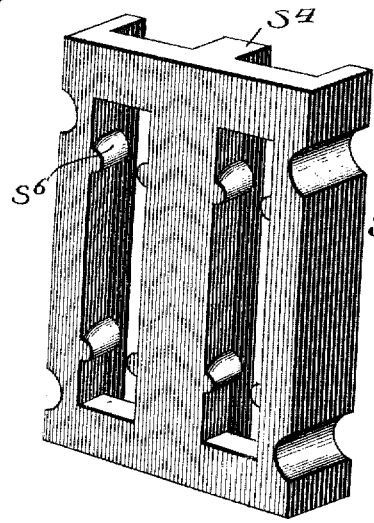
Fig. 32.
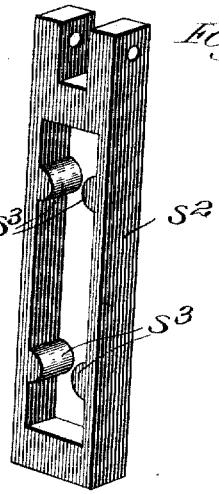
Fig. 31.
Fig. 34.
Fig. 35.
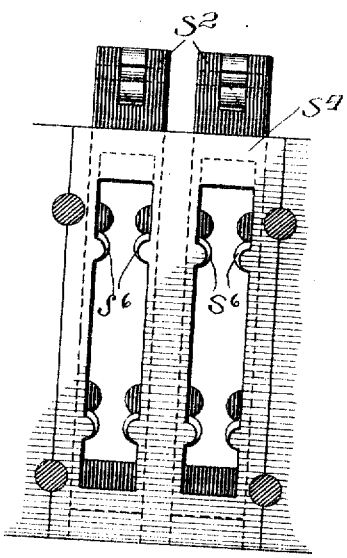
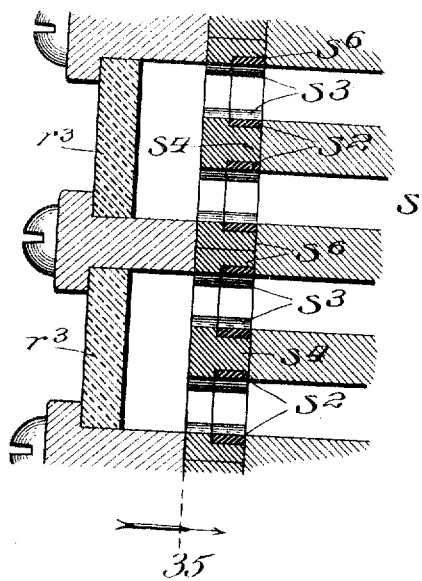
Witnesses.
Inventor:
Byron B. Carter

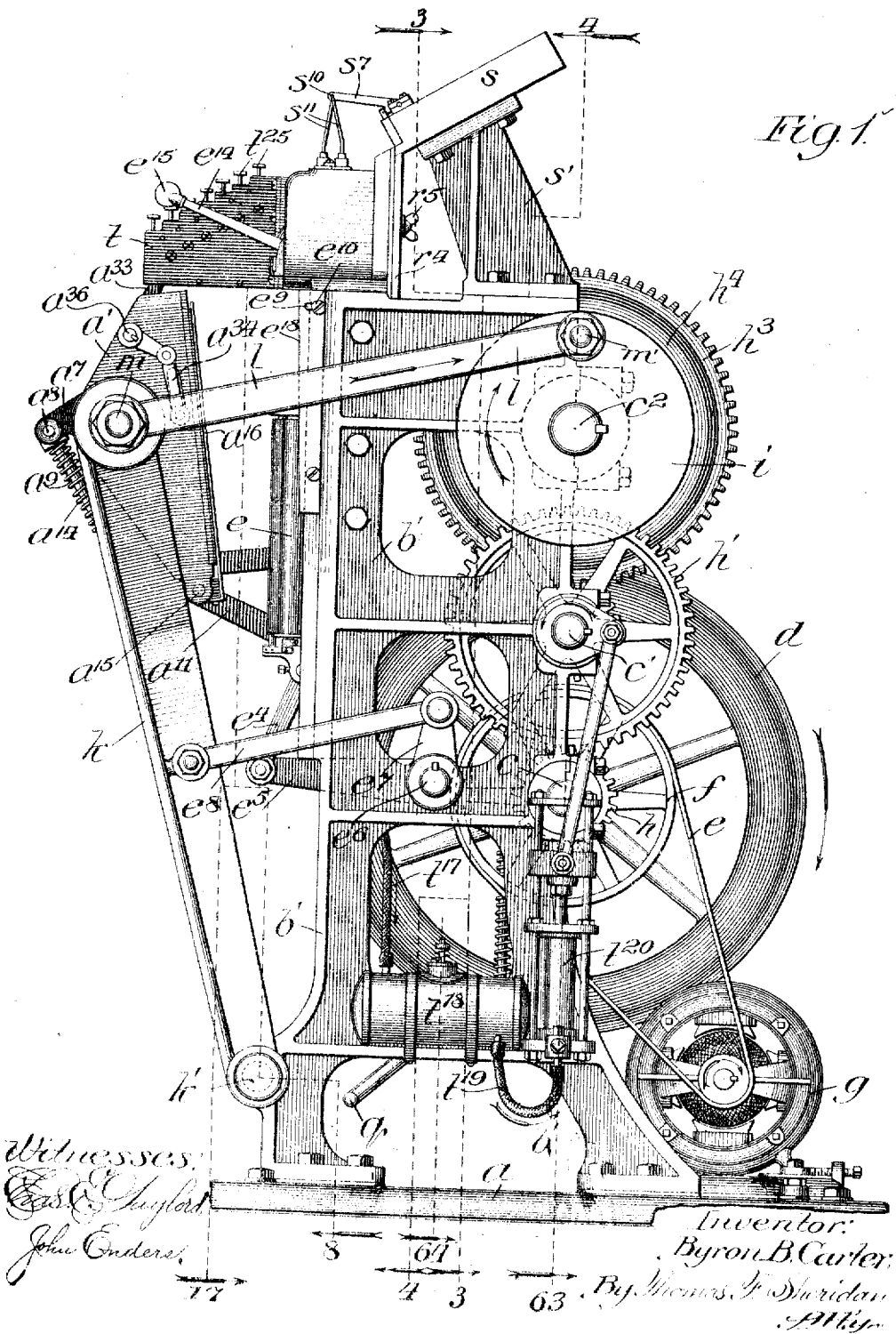

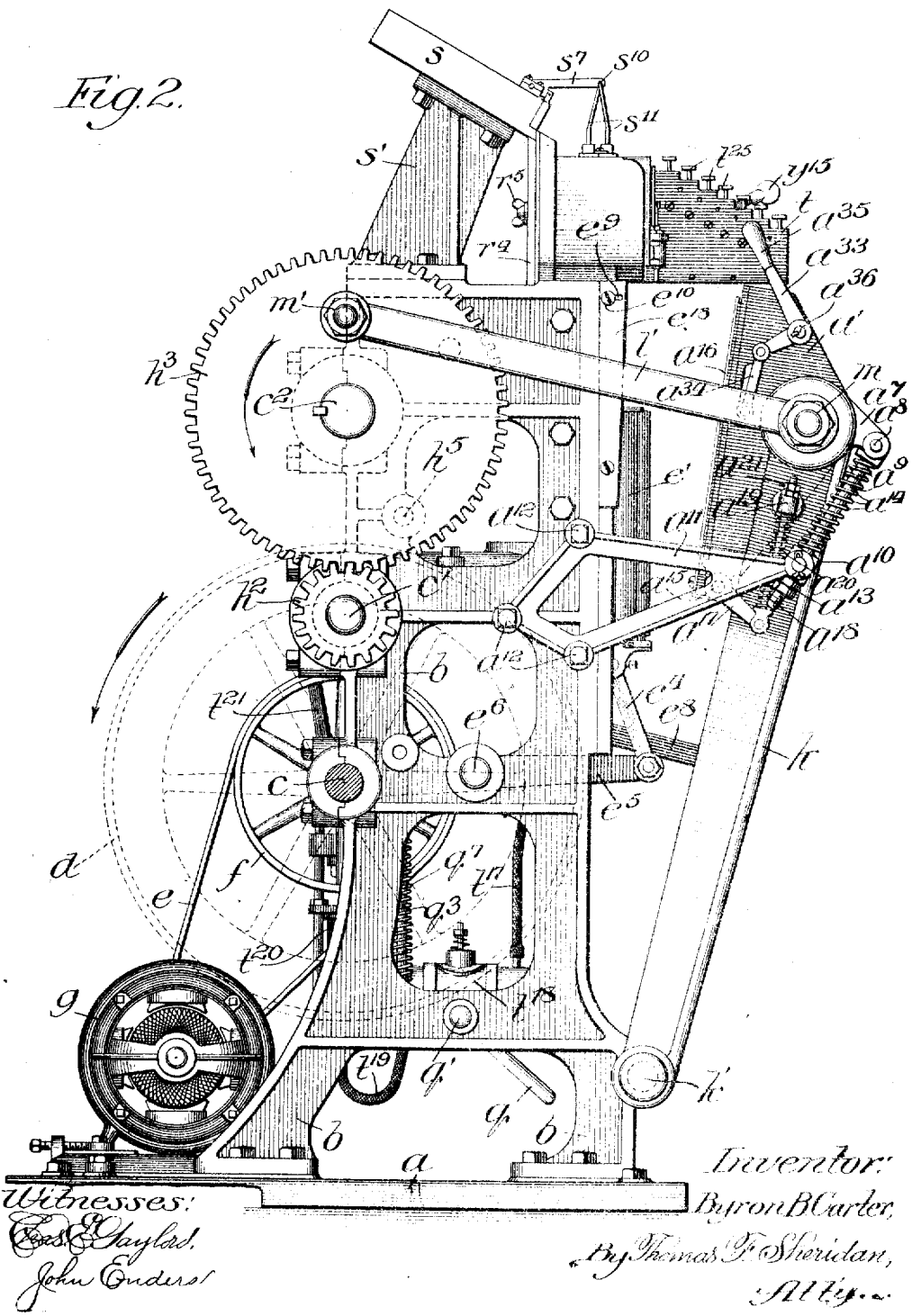

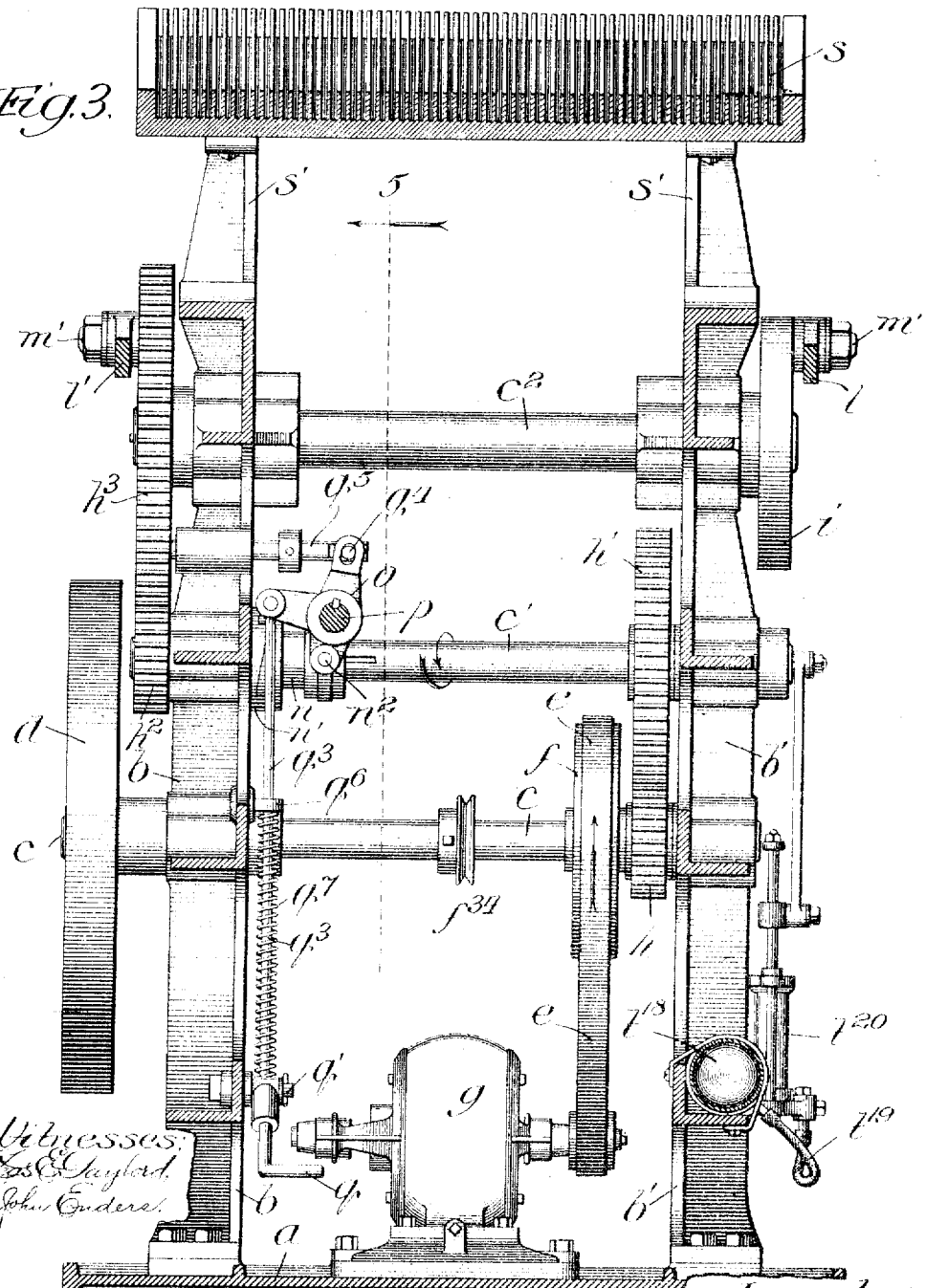

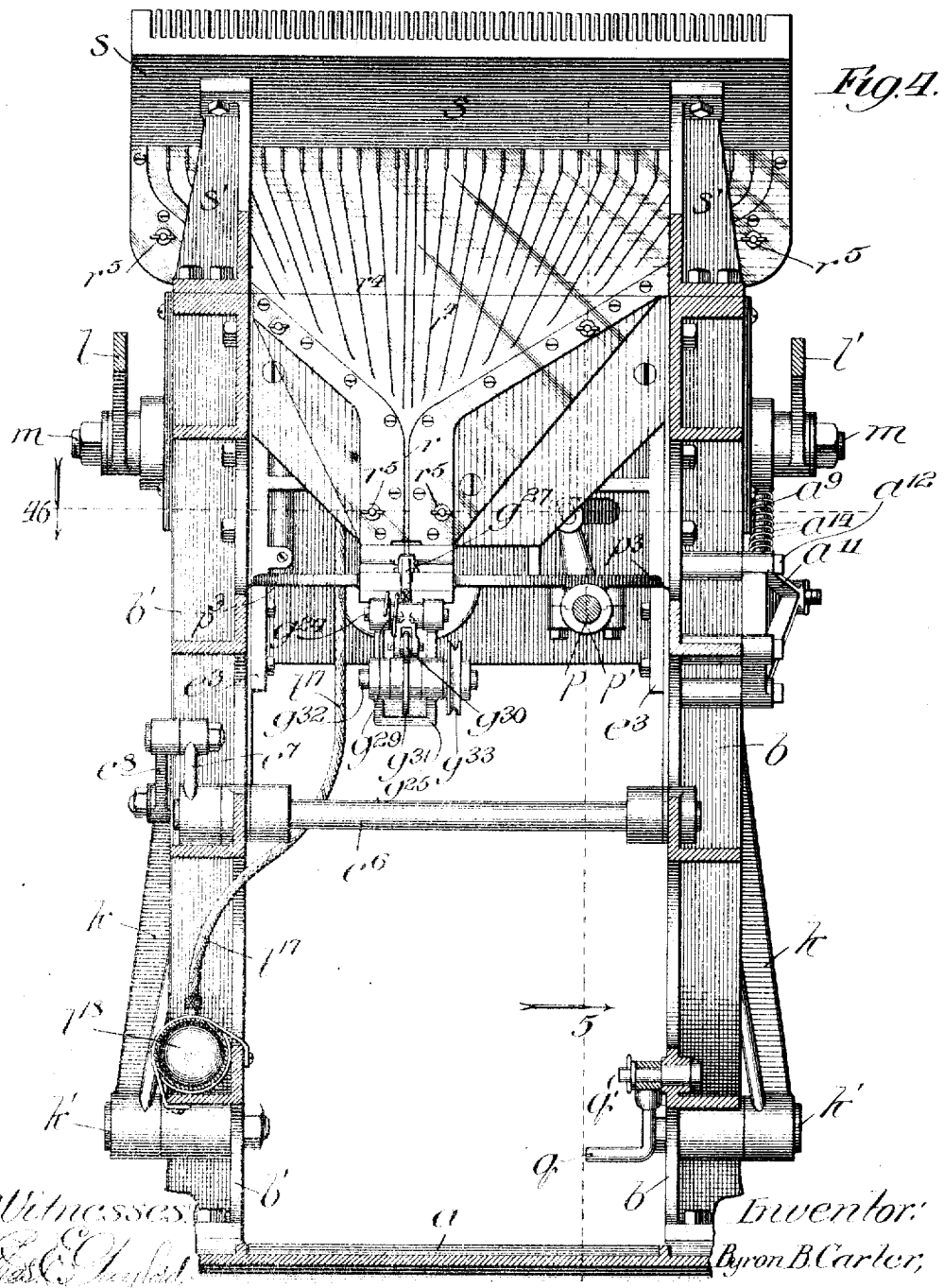

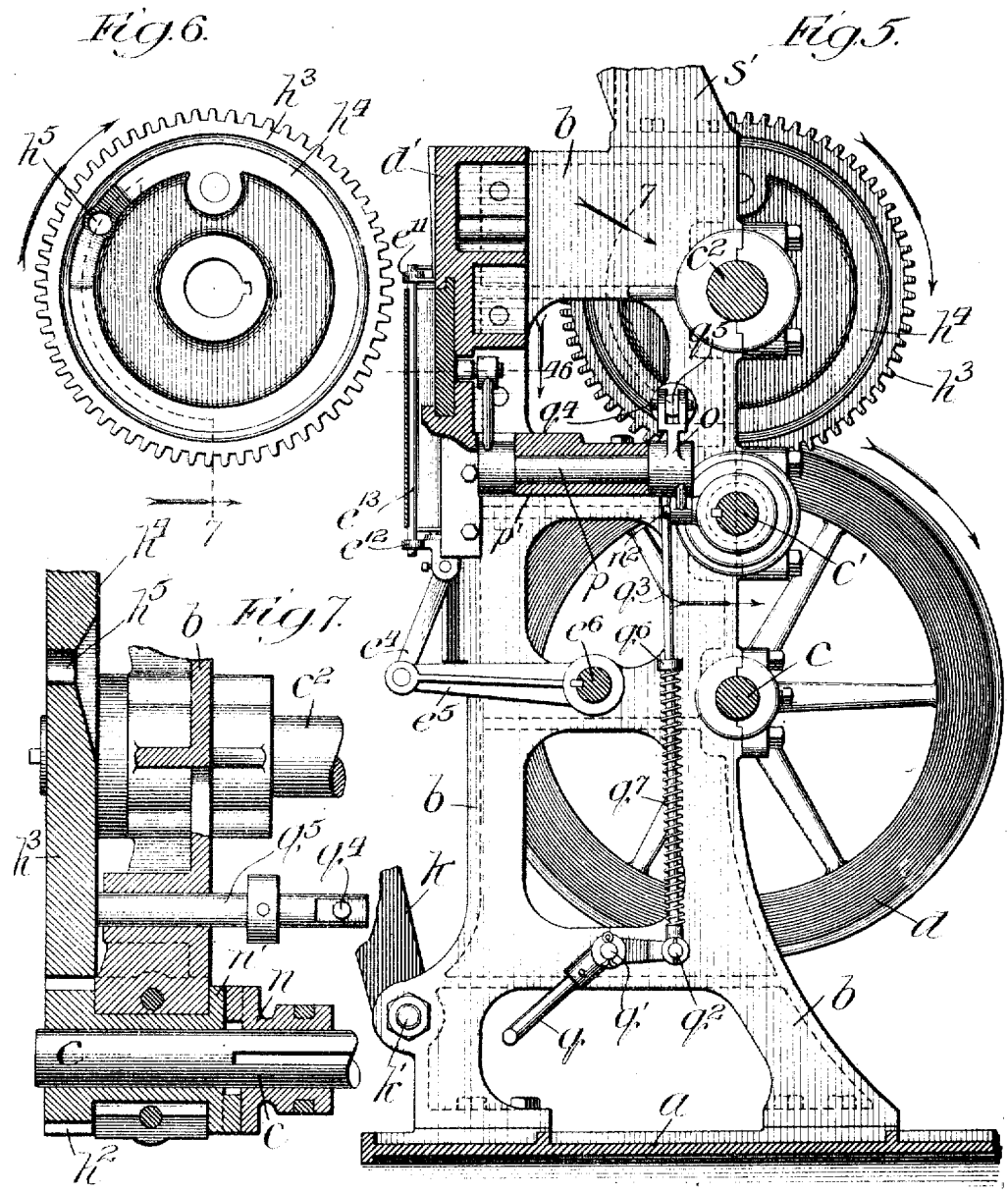

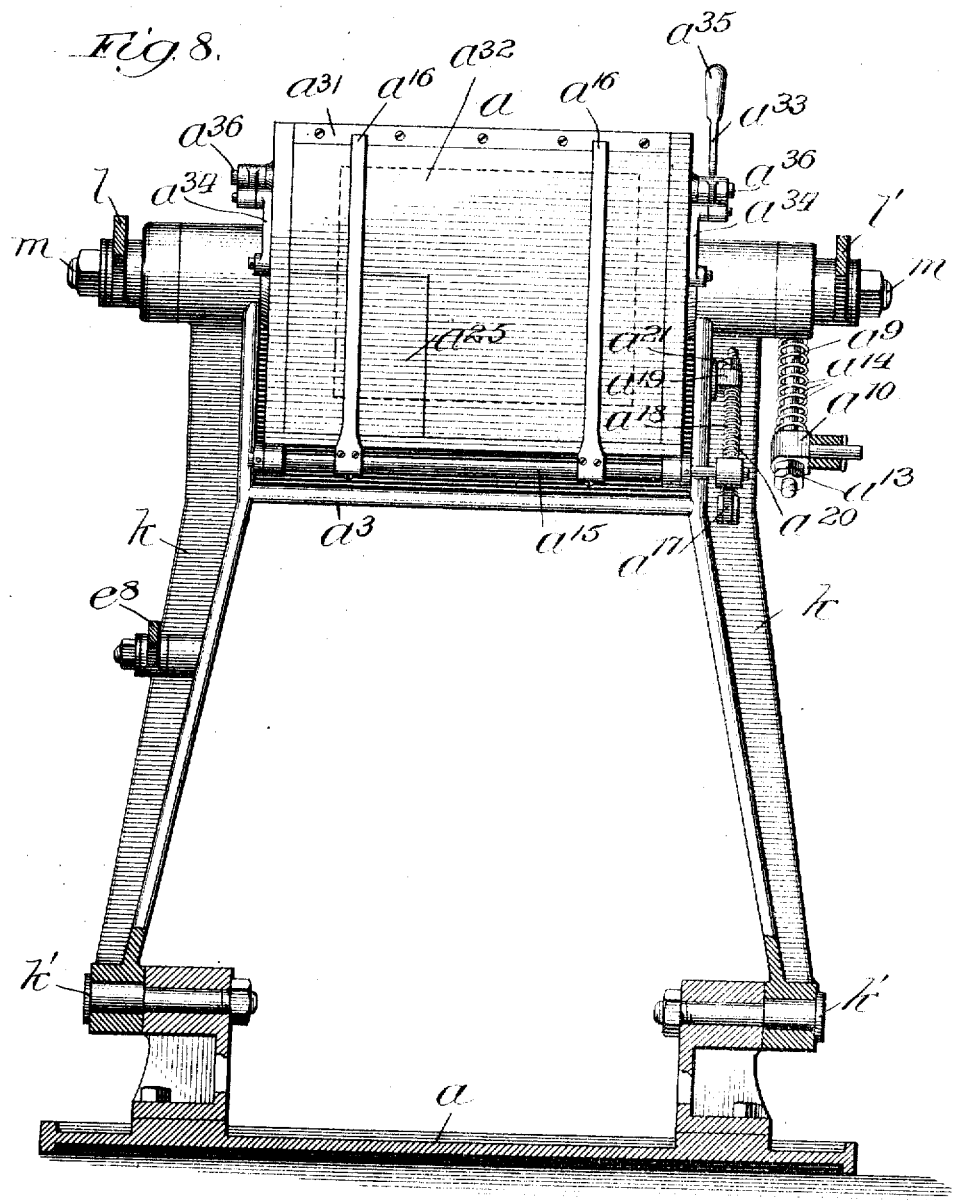

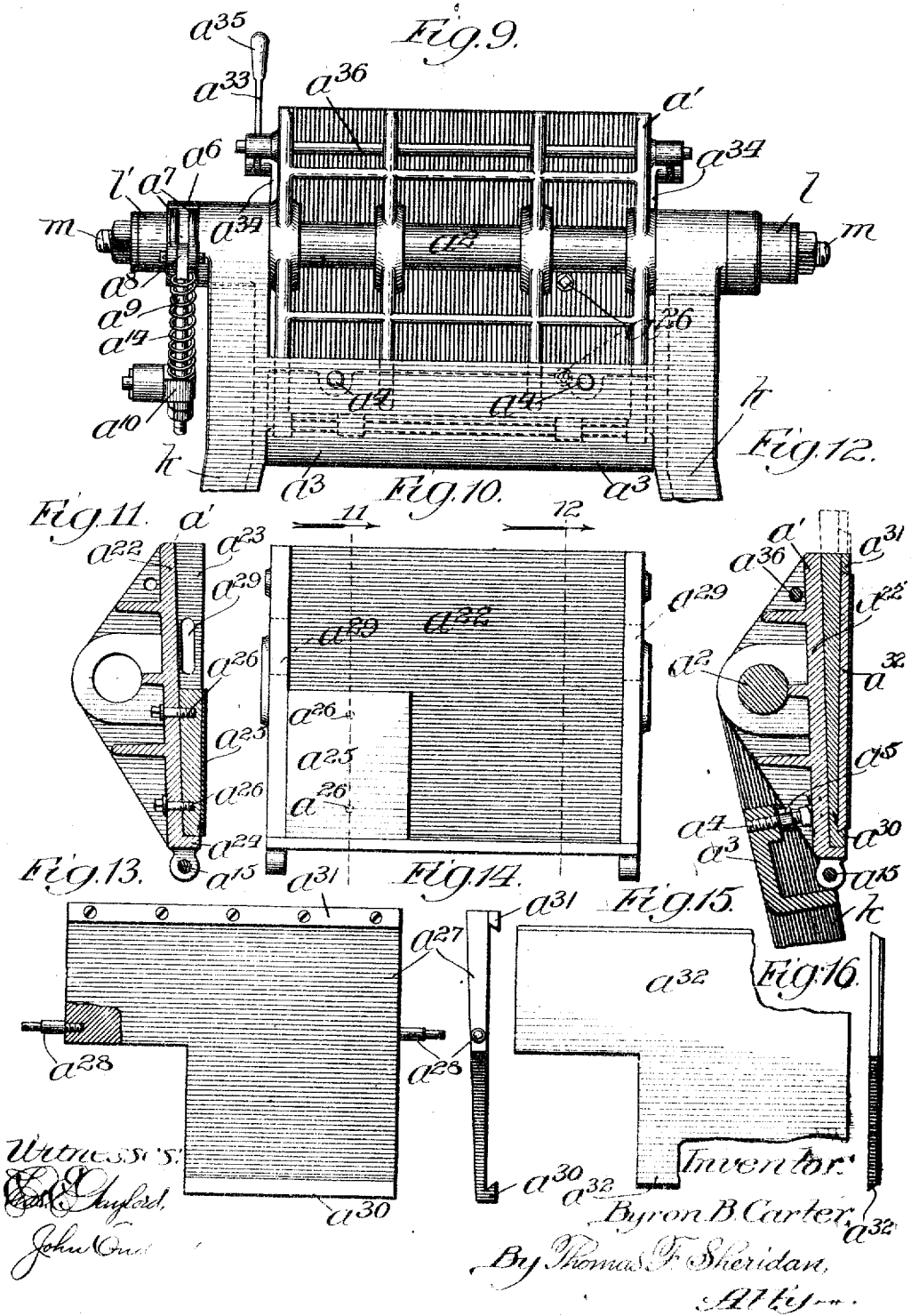

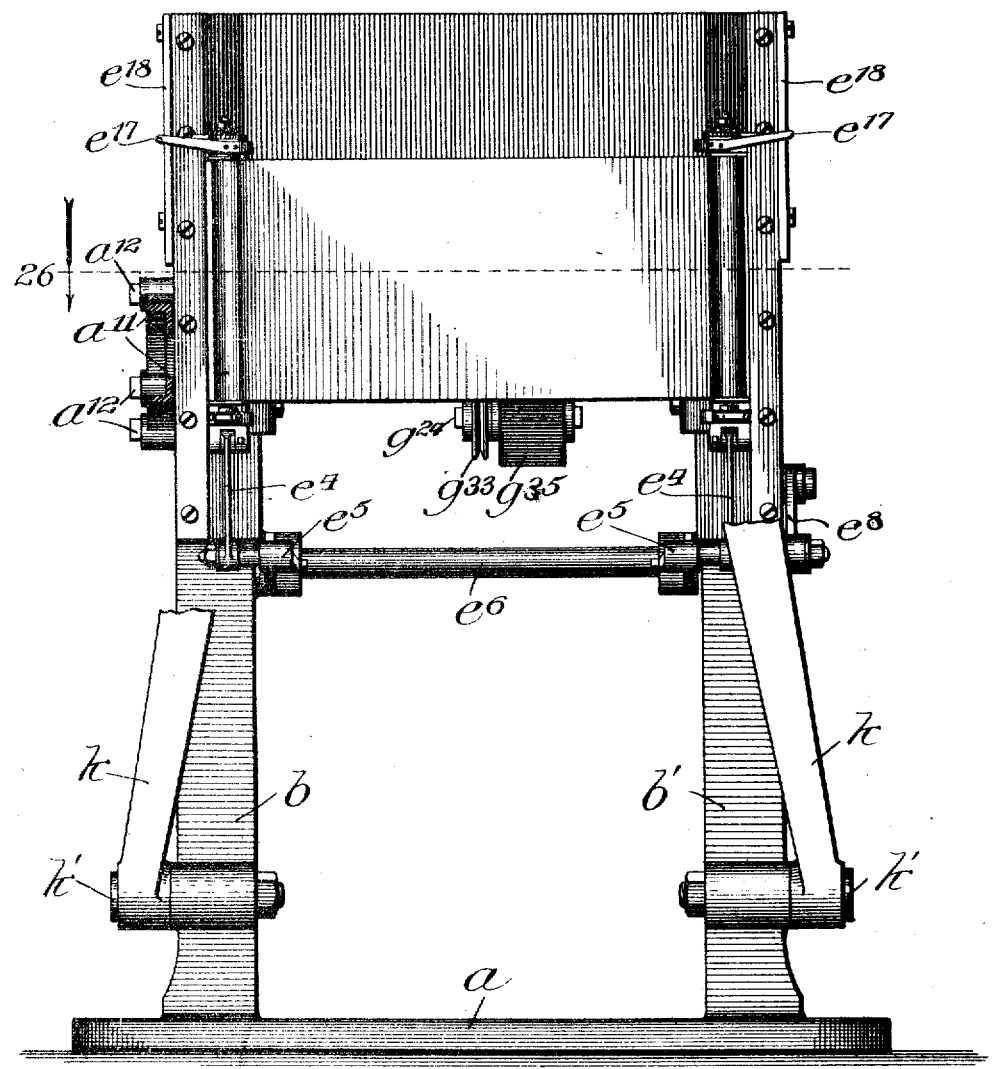

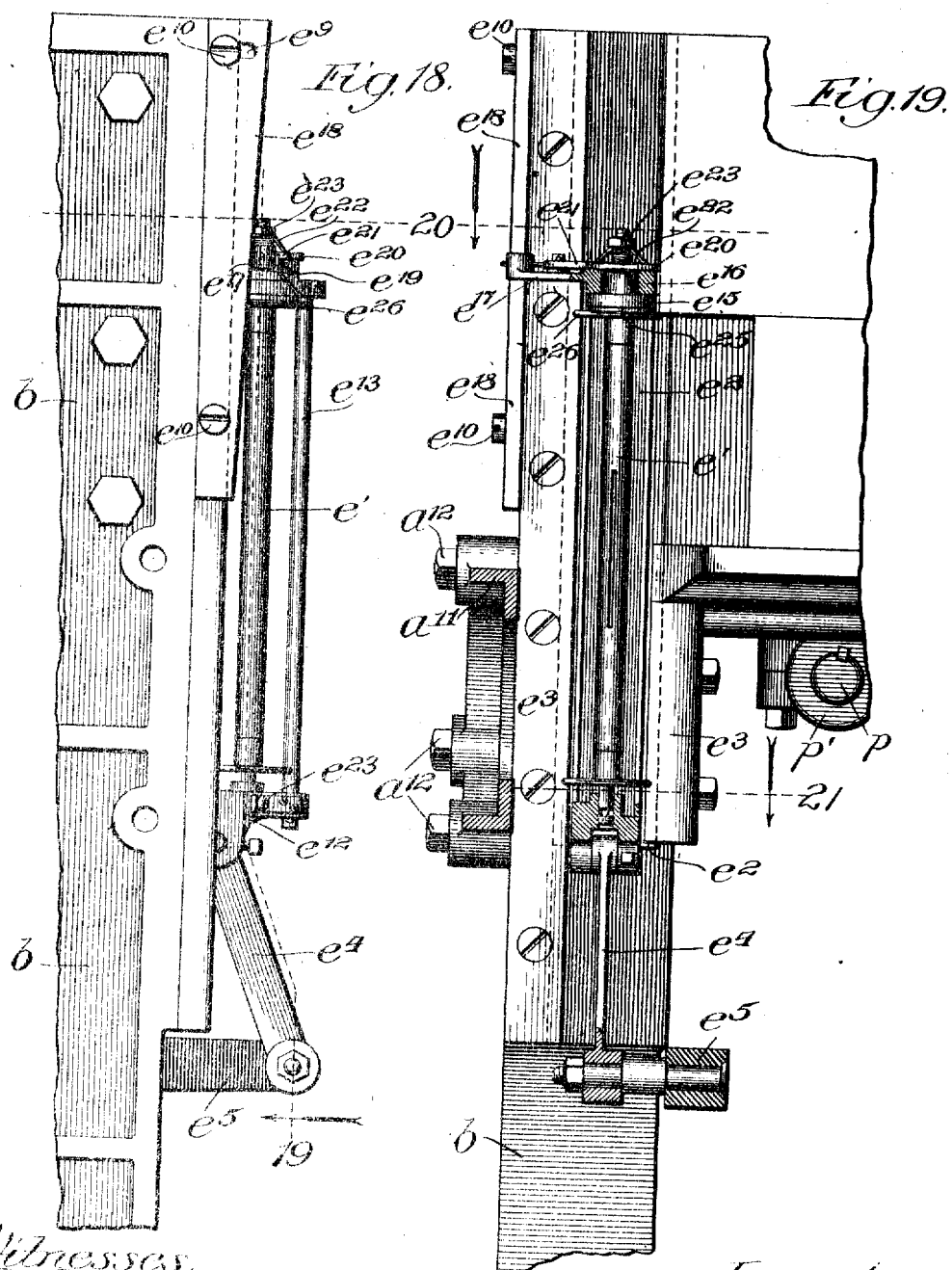

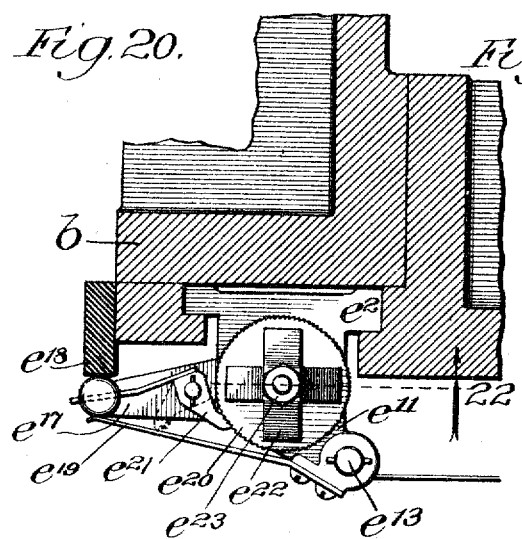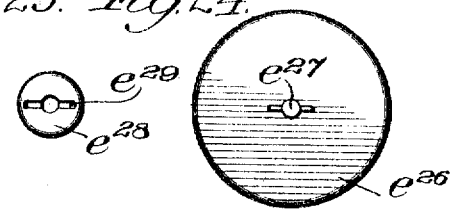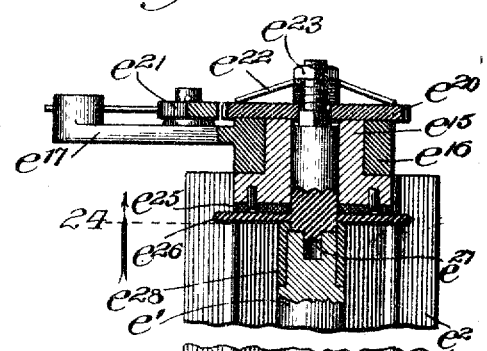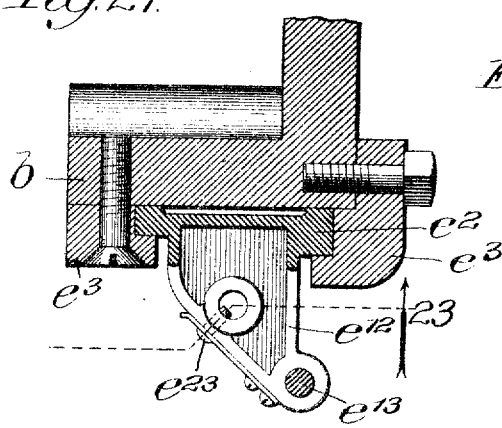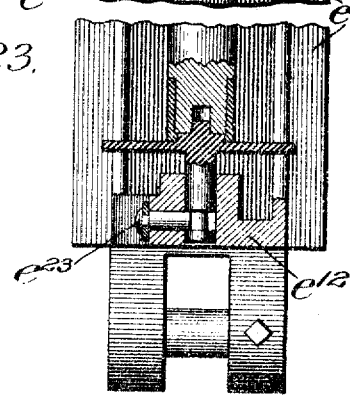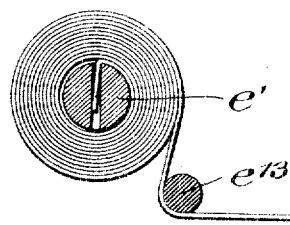

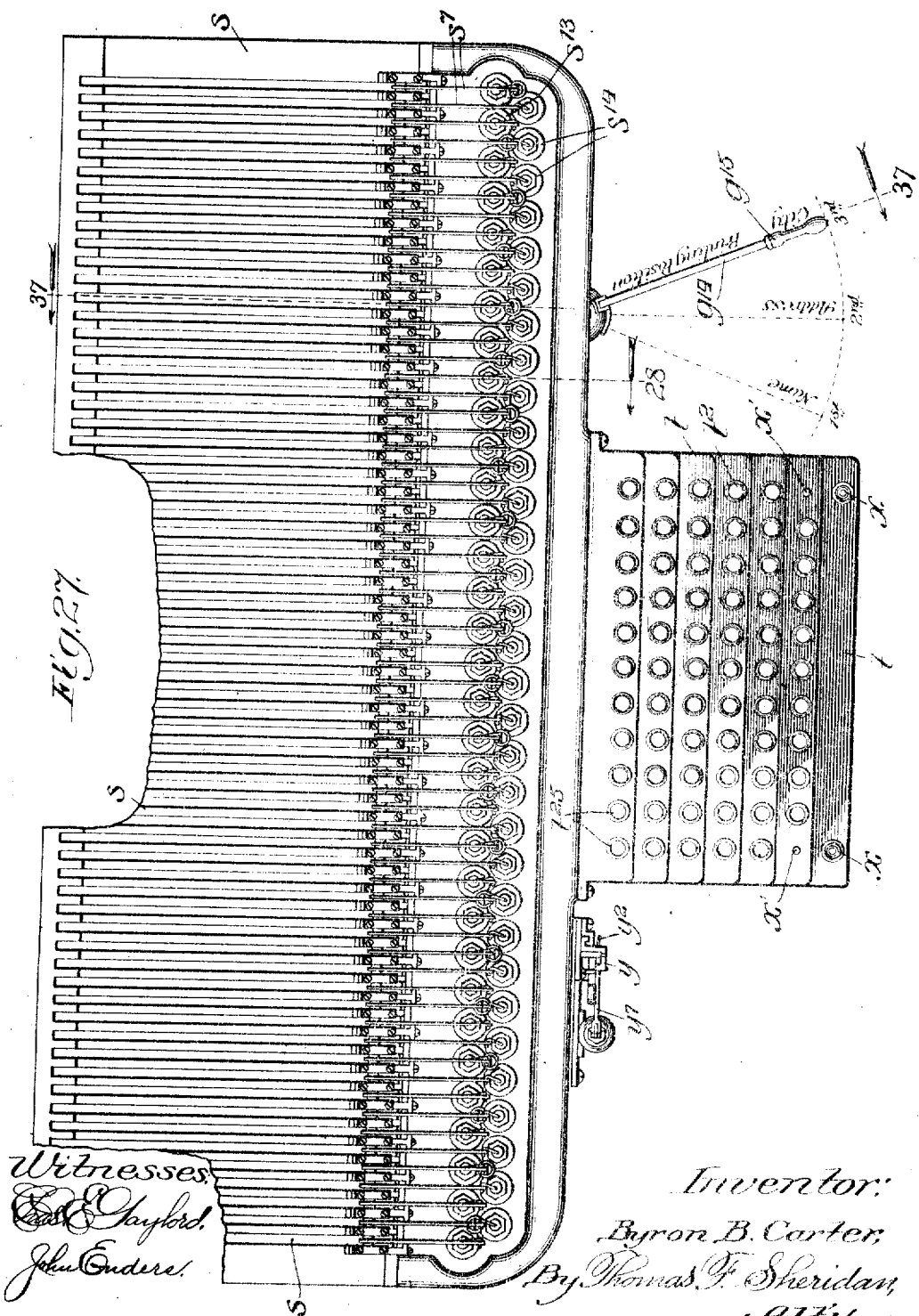

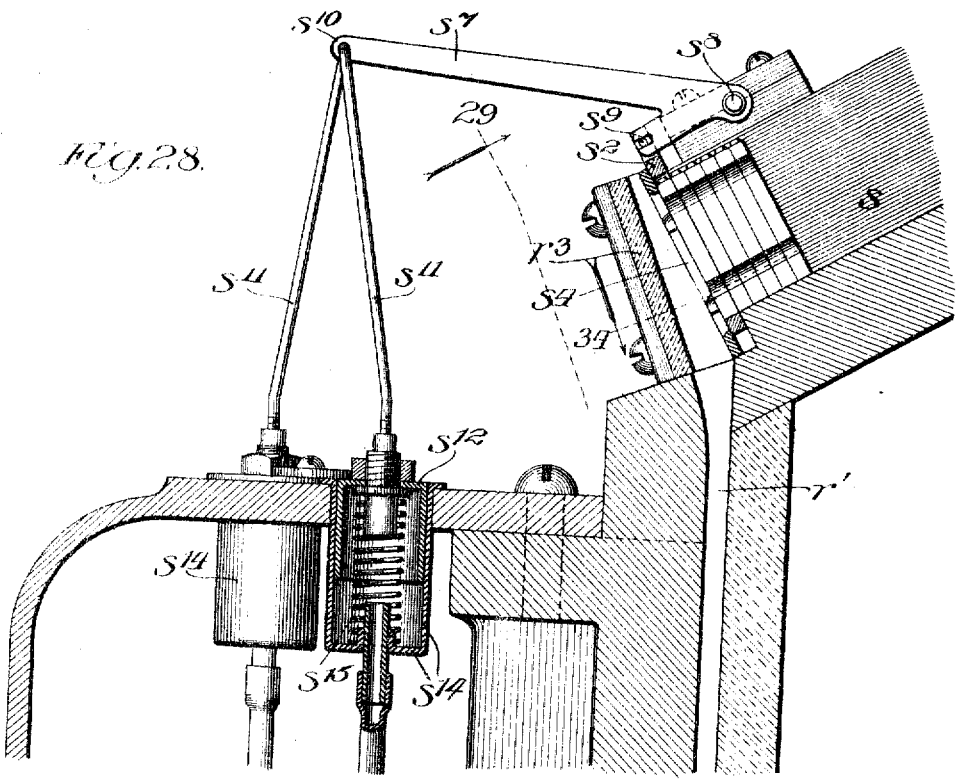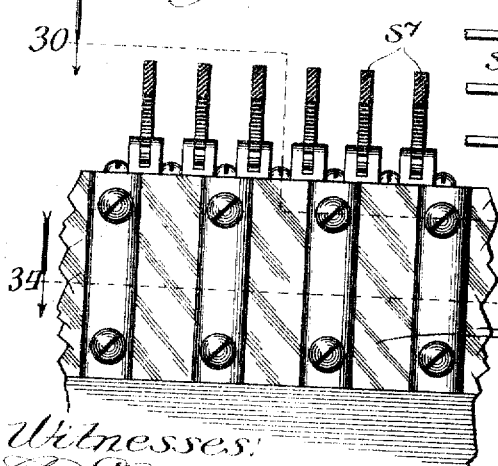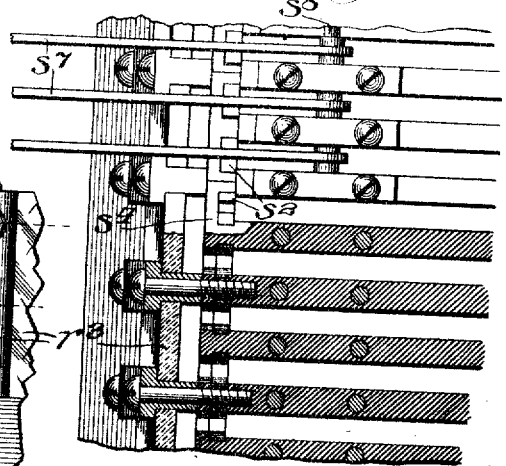

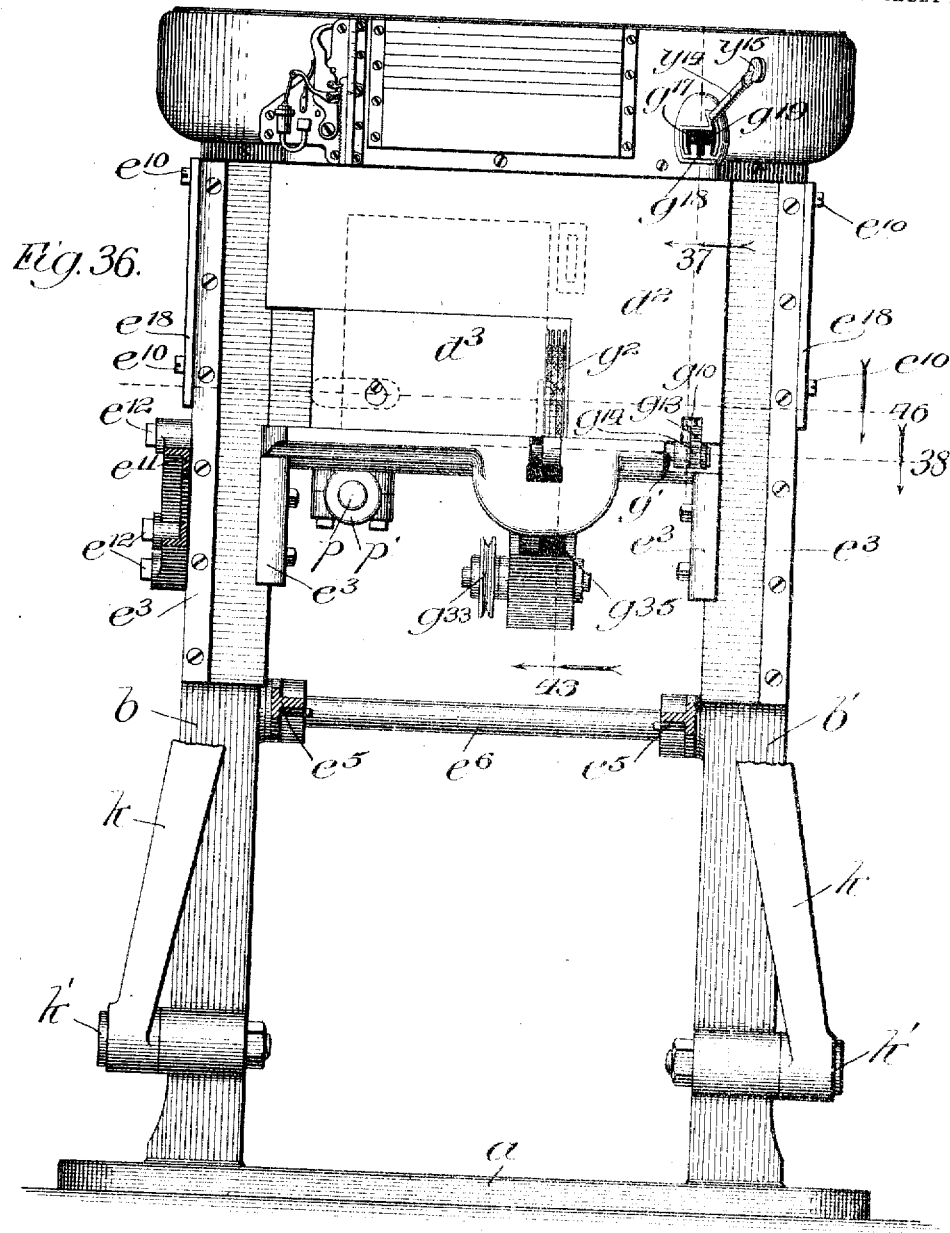

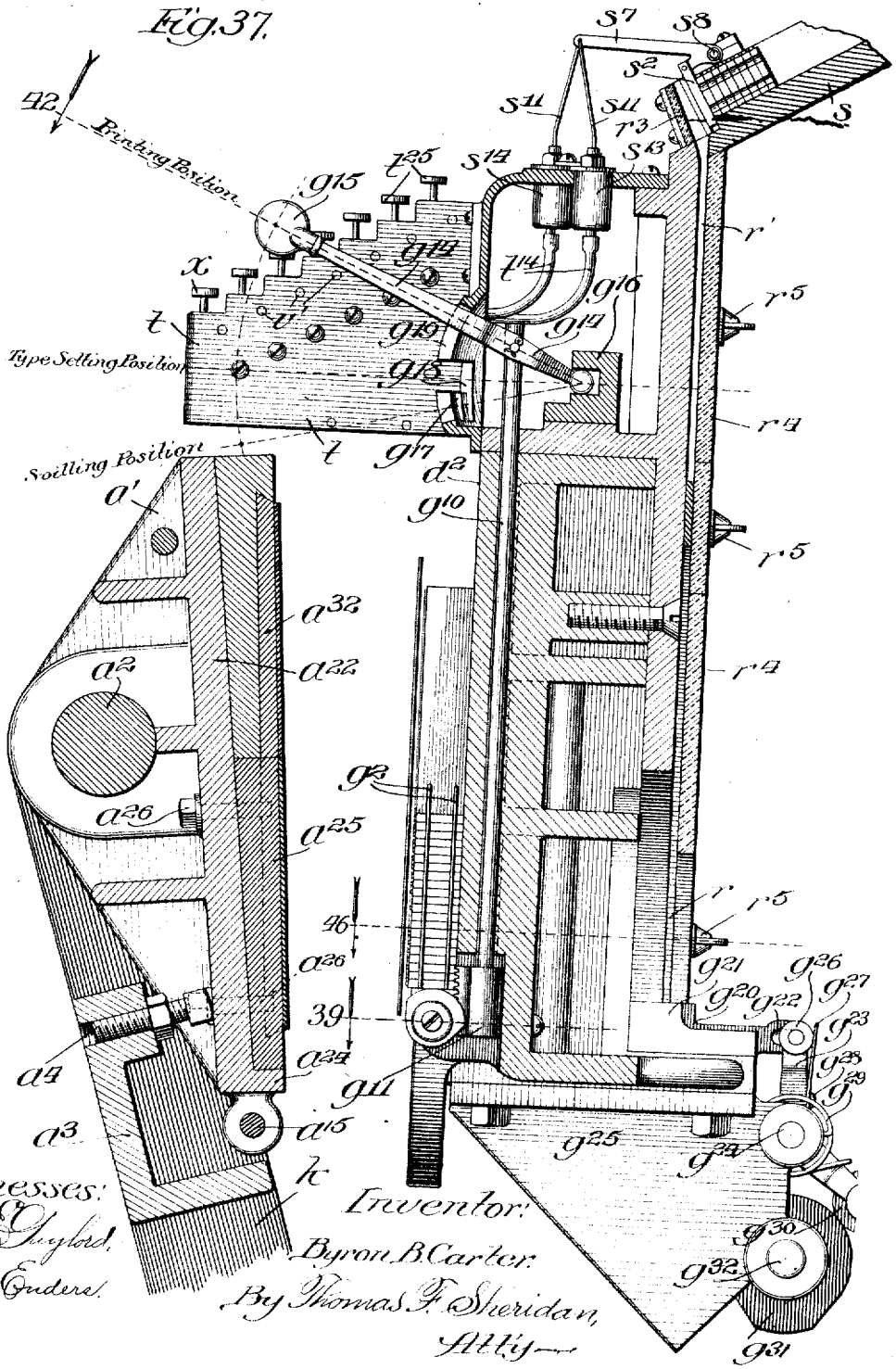

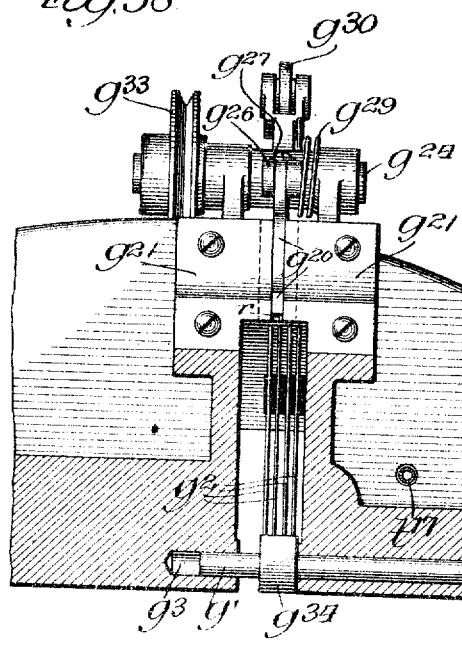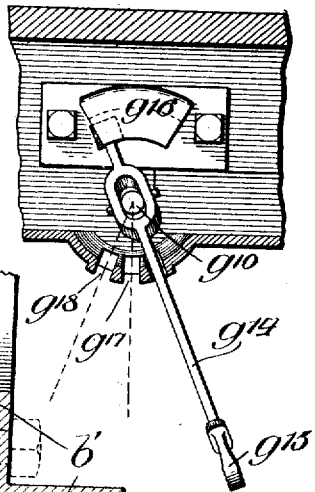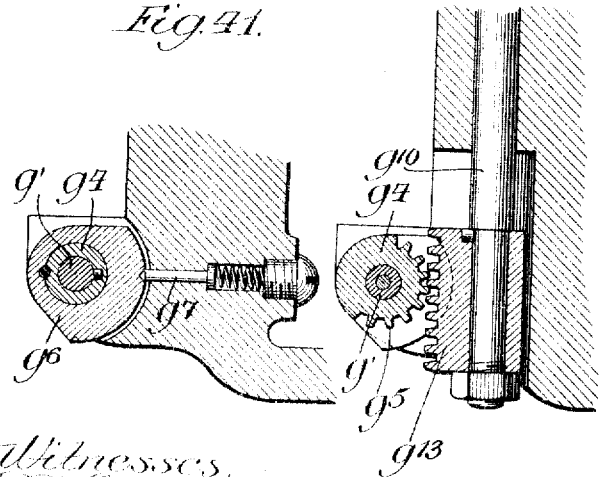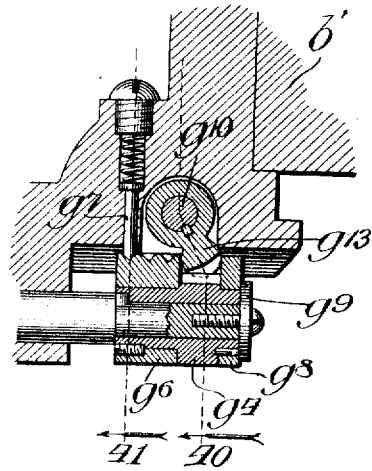

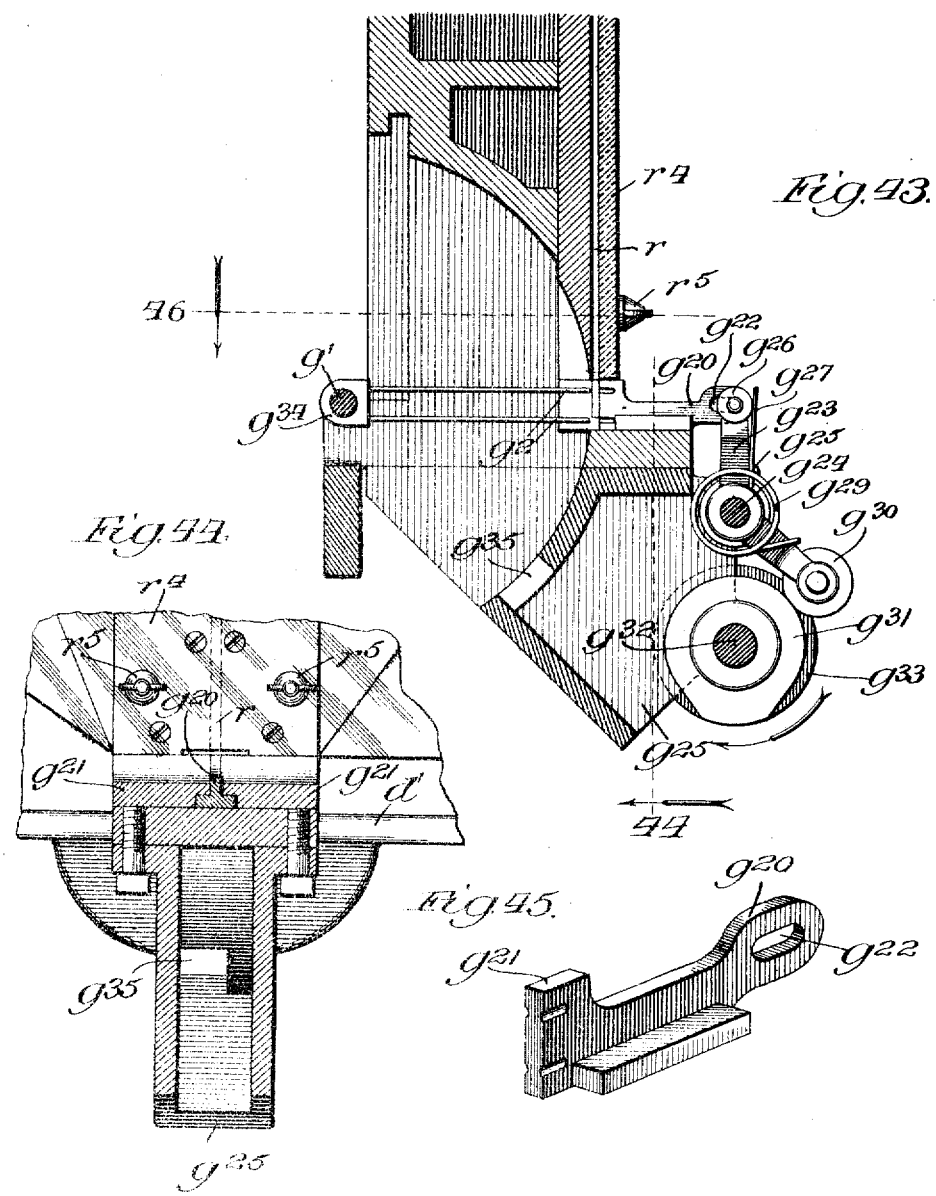

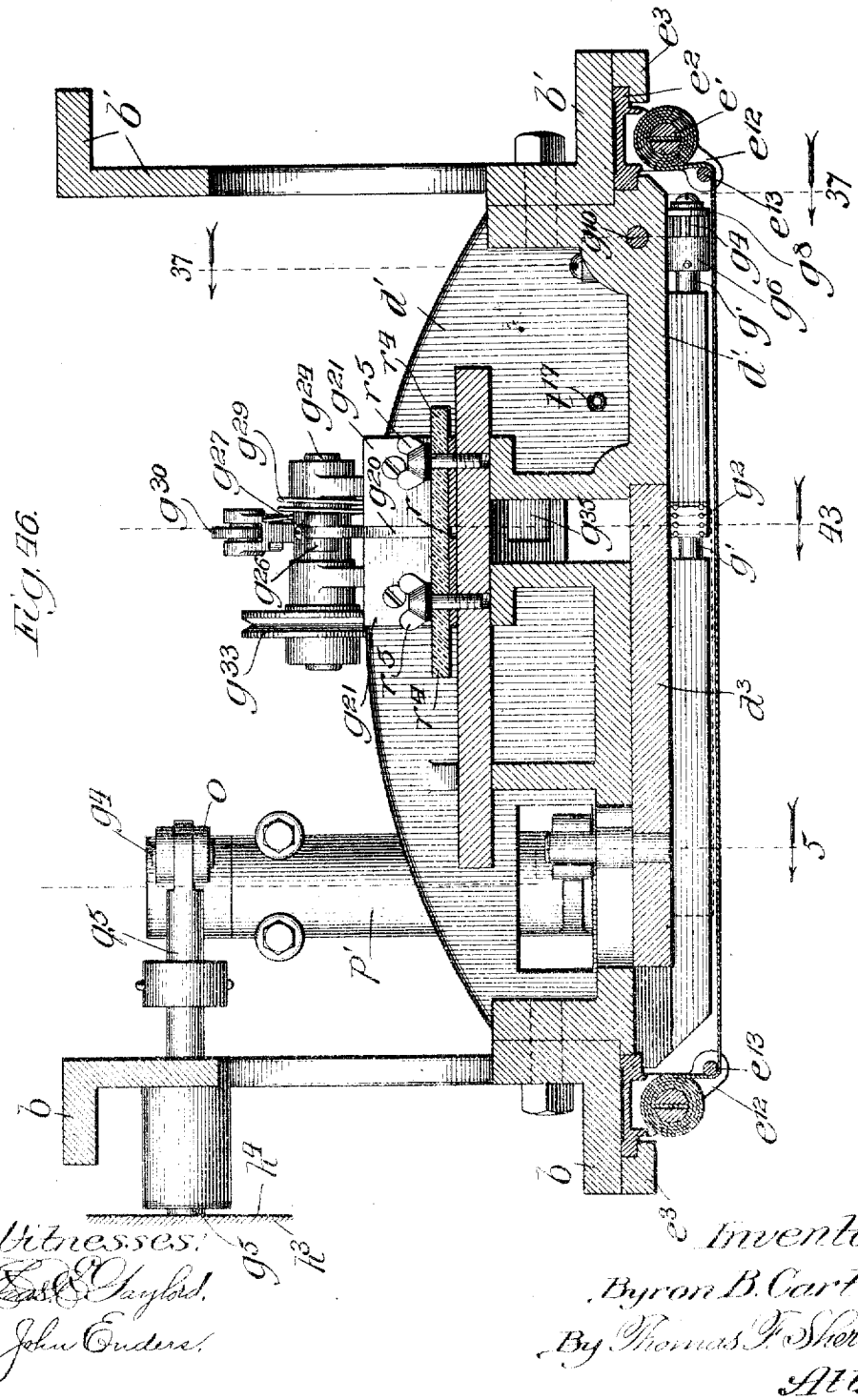

No. 829,505. PATENTED AUG. 28, 1906.
B. B. CARTER.
PRINTING PRESS.
APPLICATION FILED OCT. 26, 1905.
26 SHEETS—SHEET 19.
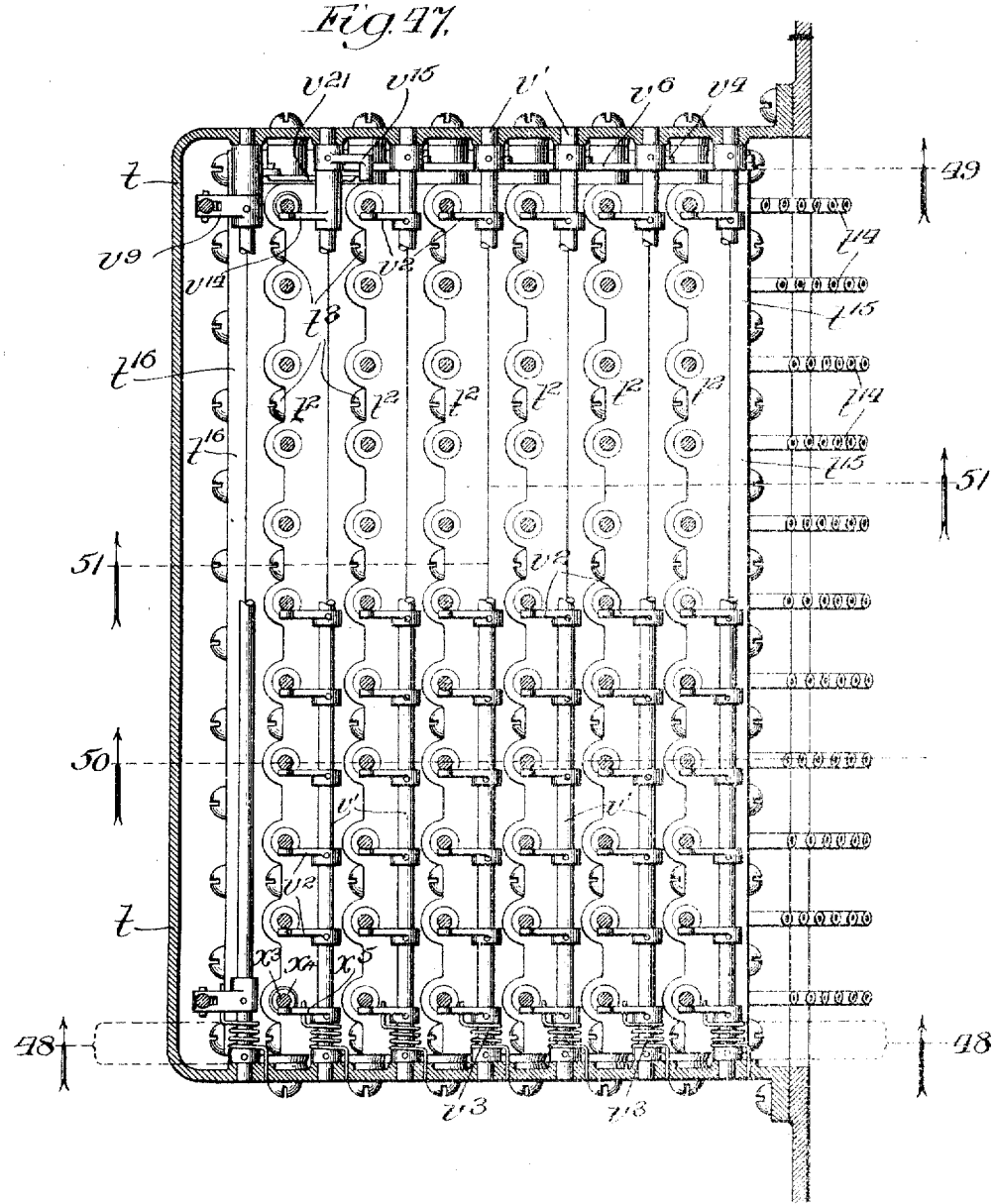
Witnesses:
Inventor,
Byron B. Carter,
By Thomas F. Sheridan,
Atty.

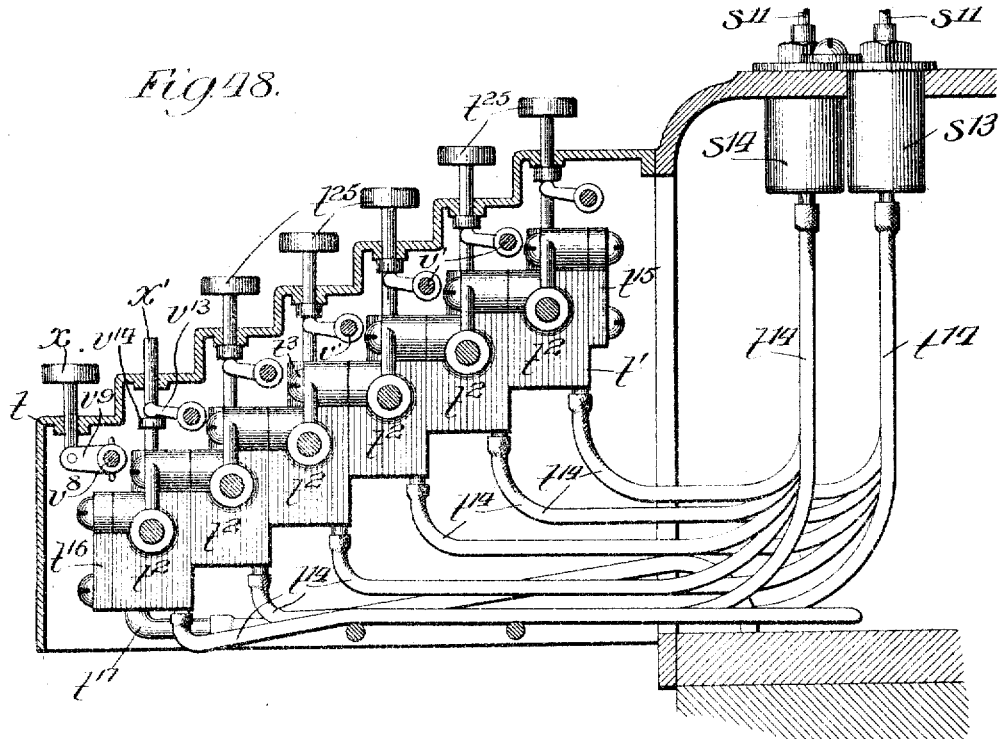
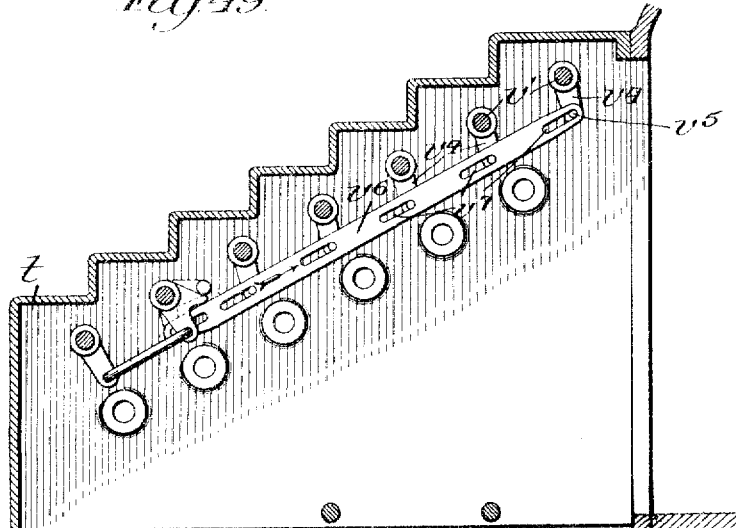

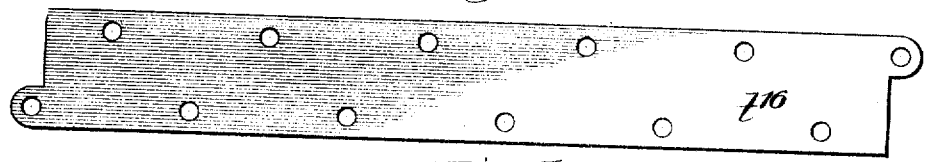
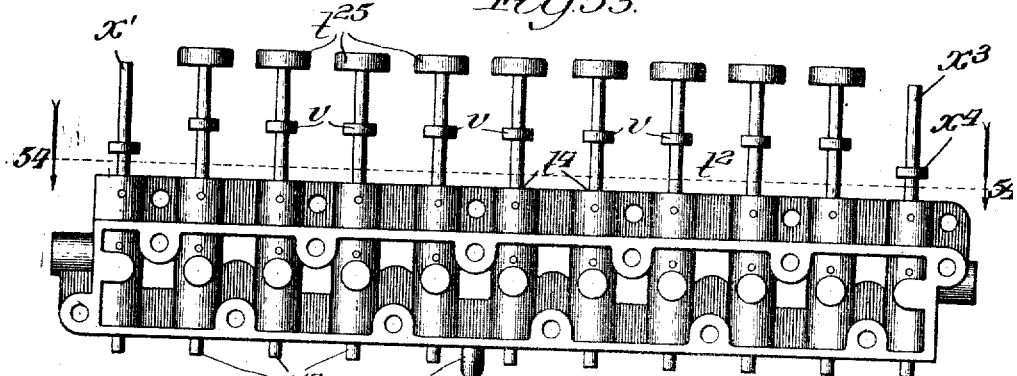
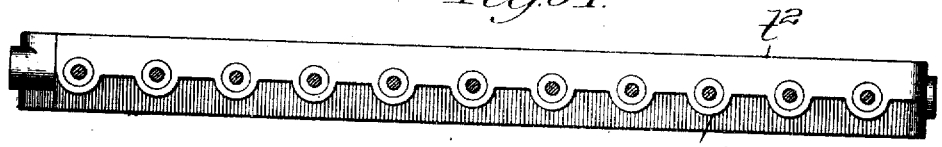
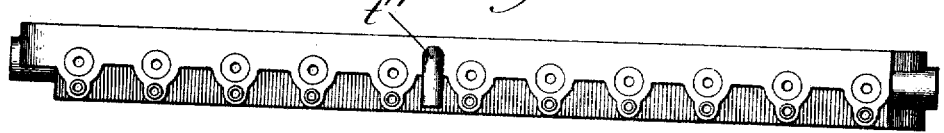
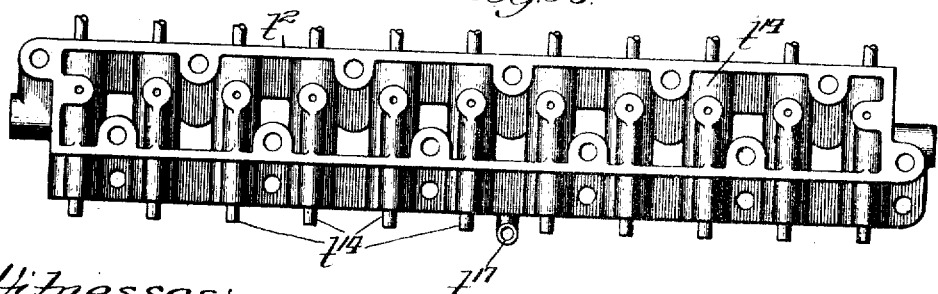

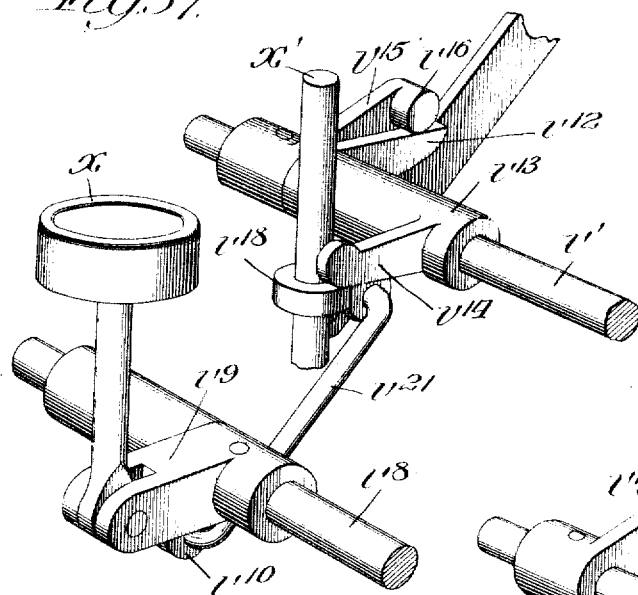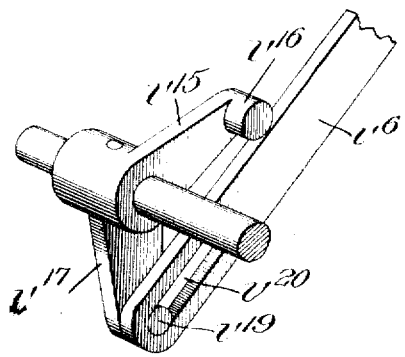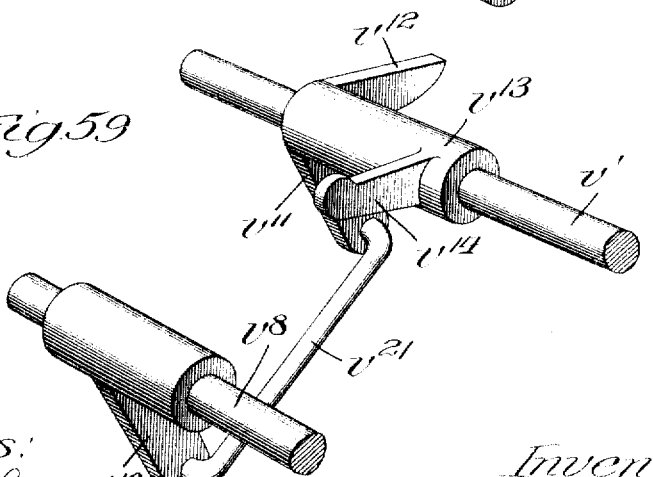

No. 829,505.  PATENTED AUG. 28, 1906.
B. B. CARTER.
PRINTING PRESS.
APPLICATION FILED OCT. 26, 1905.

26 SHEETS—SHEET 24.

Witnesses:

Inventor:
Byron B. Carter,
By Thomas F. Sheridan,
Atty.

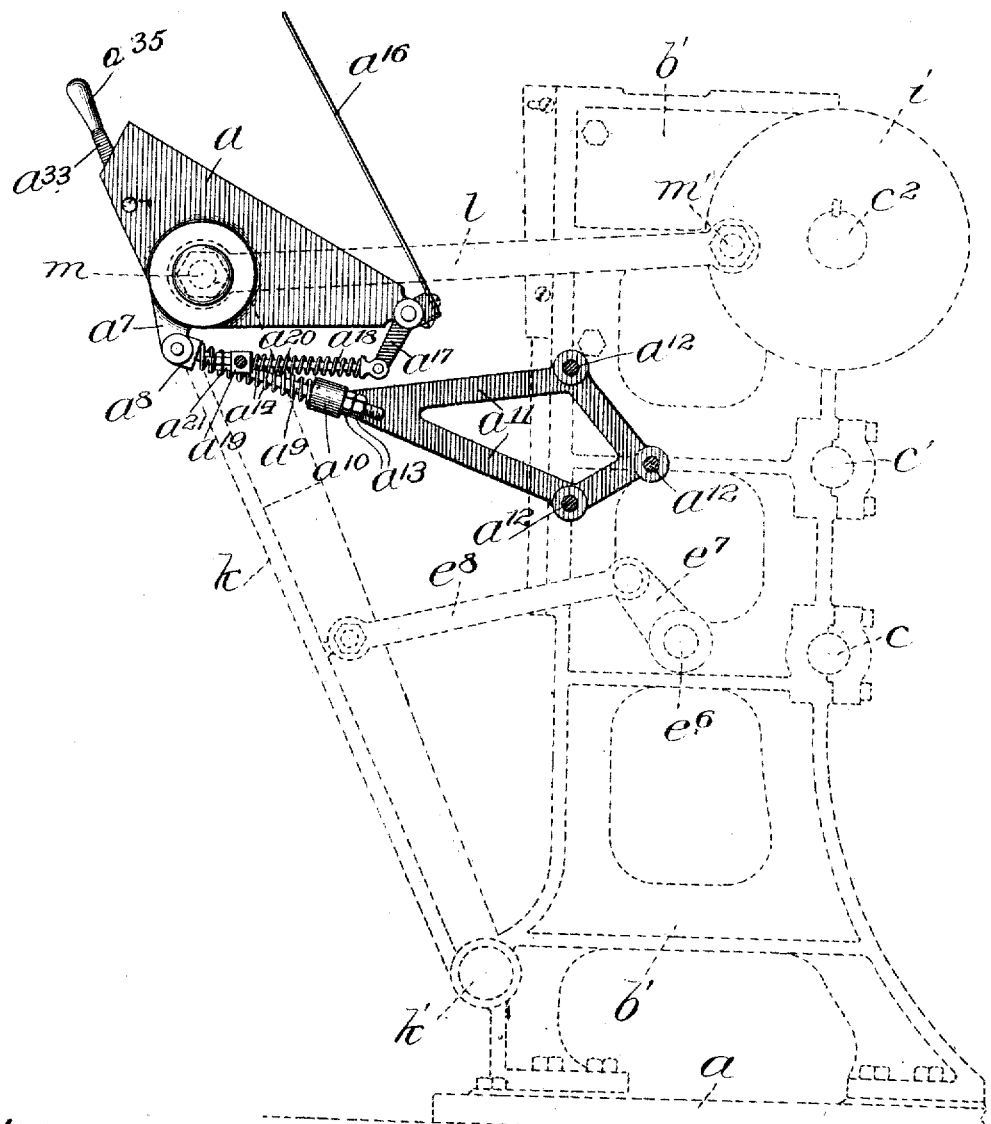

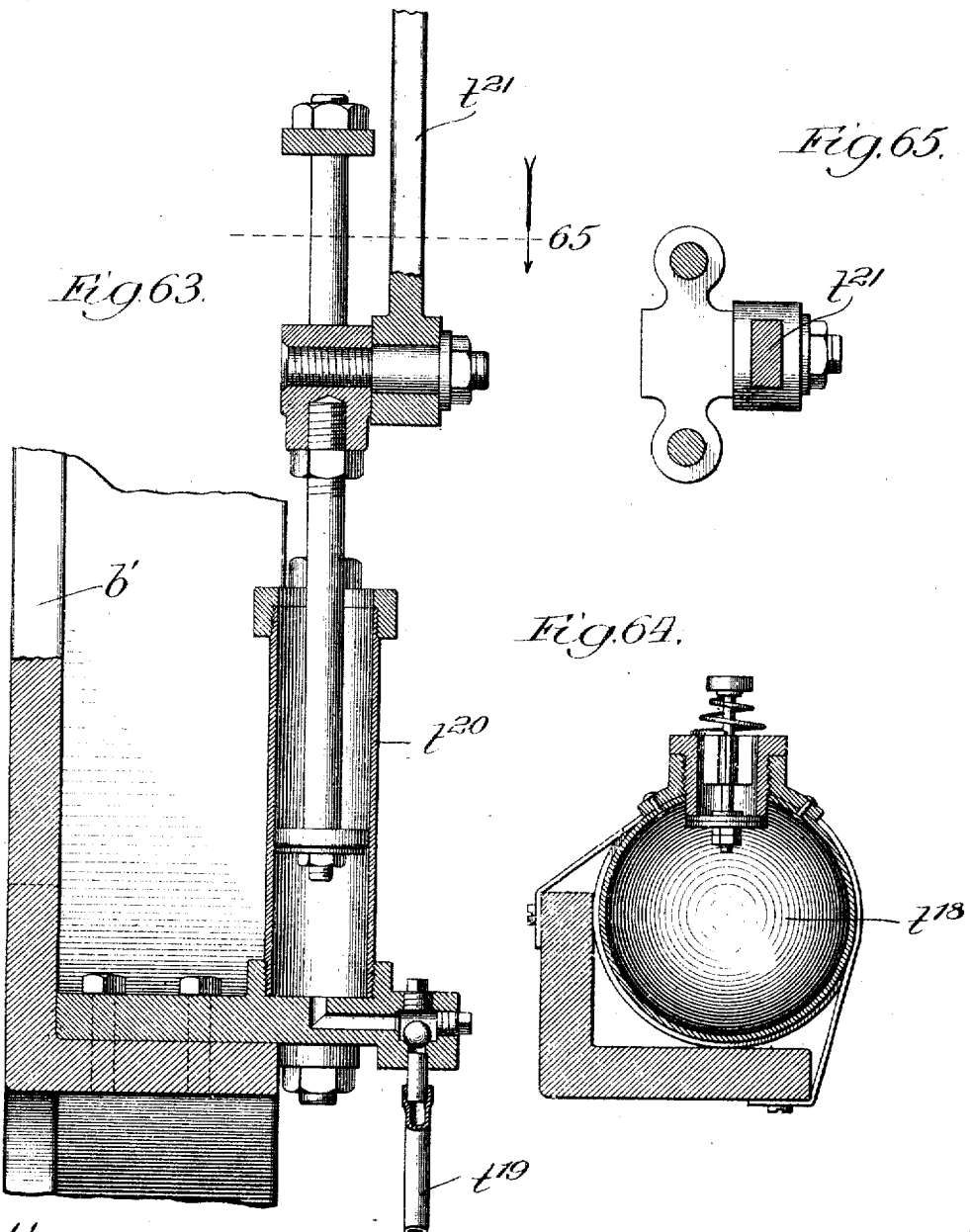

UNITED STATES PATENT OFFICE.

BYRON B. CARTER, OF HINSDALE, ILLINOIS, ASSIGNOR TO HAROLD M. VAN HOESEN, OF CHICAGO, ILLINOIS.

PRINTING-PRESS.

No. 829,505.      Specification of Letters Patent.      Patented Aug. 28, 1906.

Application filed October 26, 1905. Serial No. 284,480.

*To all whom it may concern:*

Be it known that I, BYRON B. CARTER, a citizen of the United States, residing at Hinsdale, in the county of Dupage and State of Illinois, have invented certain new and useful Improvements in Printing-Presses, of which the following is a specification.

My invention relates to printing-presses designed more especially to print in imitation of ordinary type-writing, and has for its object to produce an efficient press for this purpose, though it will be understood that my press is not limited in use to the printing of such imitation type-writing, but may be used, if desired, as an ordinary press.

Figure 50:
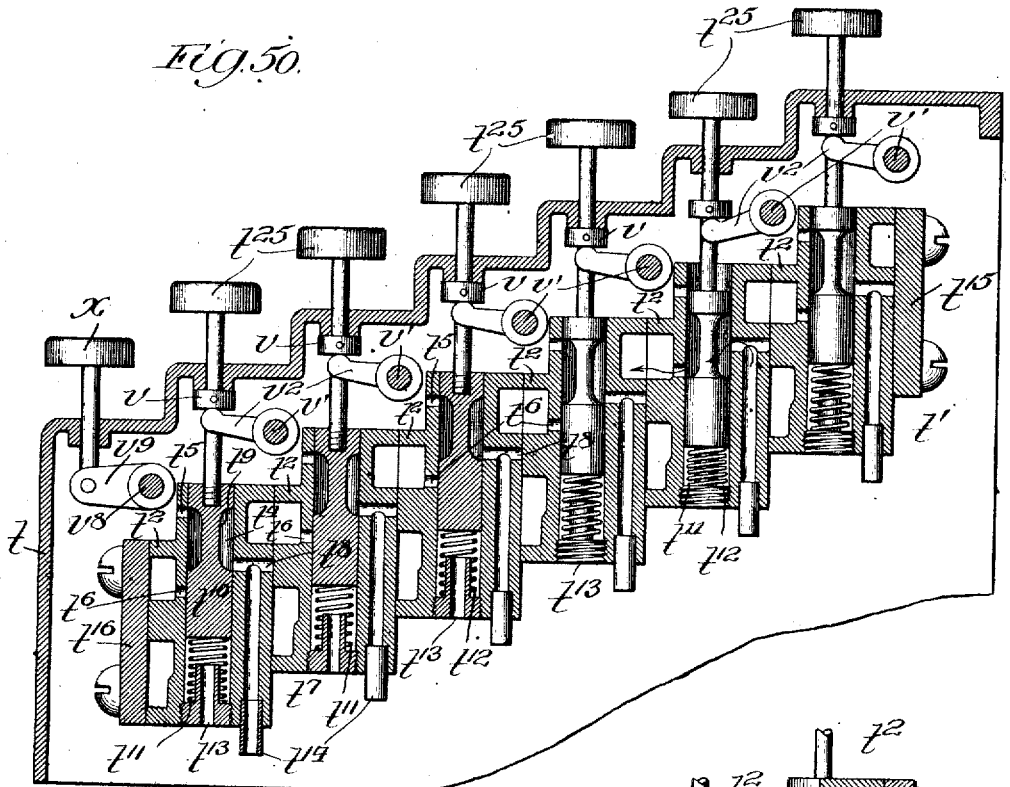
Figure 51:
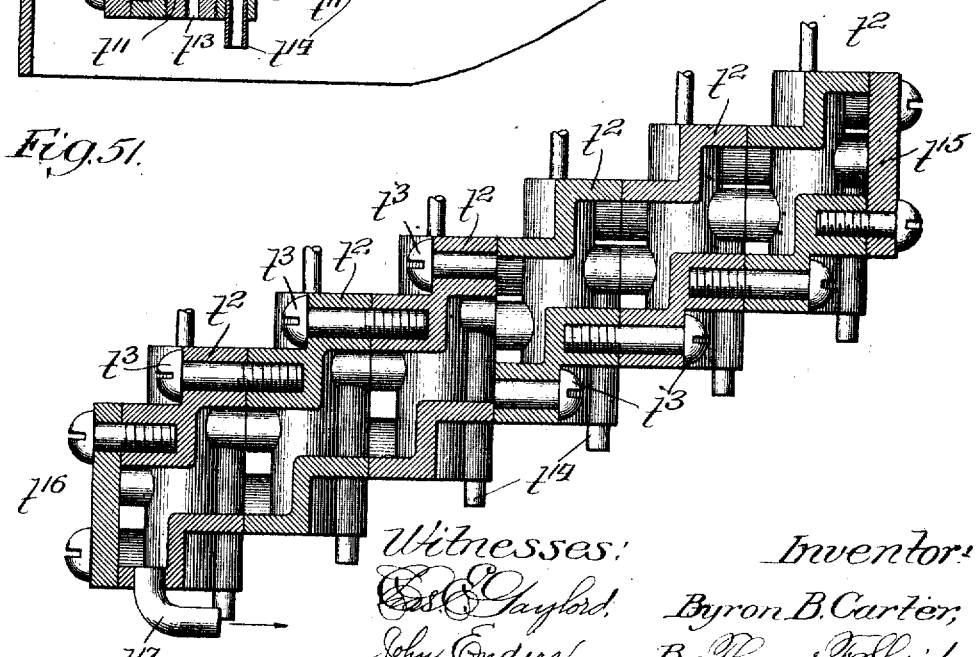
Figure 60:
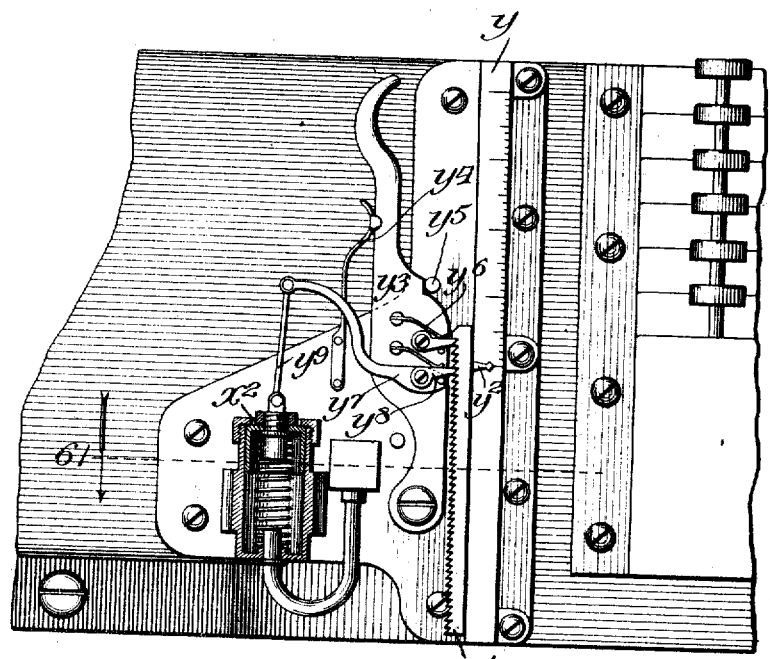
Figure 61:
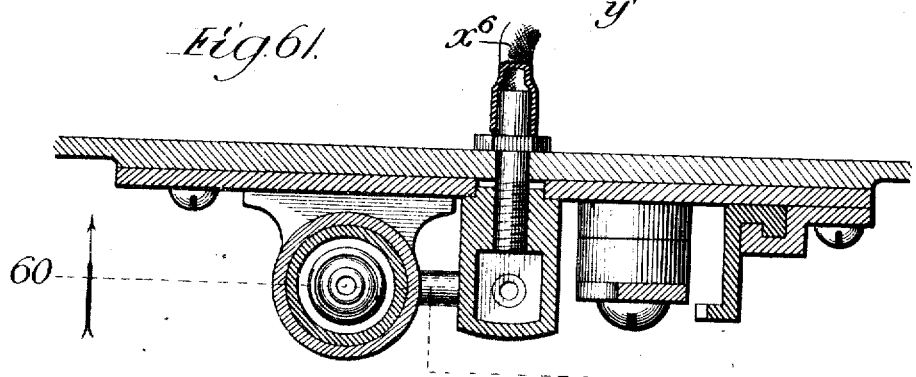

In the accompanying drawings, Figures 1 and 2 are side elevations of opposite sides of the machine. Fig. 3 is a sectional elevation taken on line 3 3 of Fig. 1. Fig. 4 is a rear sectional elevation taken on line 4 4 of Fig. 1. Fig. 5 is a sectional elevation taken on lines 5 5 of Figs. 3, 4, and 46. Fig. 6 is a detail view. Fig. 7 is a sectional developed view taken on lines 7 of Figs. 5 and 6. Fig. 8 is a sectional elevation taken on line 8 of Fig. 1. Fig. 9 is a rear elevation of the upper end of the platen and yoke. Figs. 10 to 16, inclusive, are detail views of the platen. Fig. 17 is a sectional elevation taken on line 17 of Fig. 1. Fig. 18 is an enlarged sectional elevation of a portion of the form-carrying frame and ribbon-carrying spool. Fig. 19 is a front elevation of the parts shown in Fig. 17. Fig. 20 is a plan sectional view taken on line 20 of Figs. 18 and 19. Fig. 21 is a section taken on line 21 of Fig. 19. Fig. 22 is a broken sectional elevation taken on line 22 of Fig. 20. Fig. 23 is a vertical section taken on line 23 of Fig. 21. Figs. 24 and 25 are detail views. Fig. 26 is a diagrammatic view of the ribbon and ribbon-spool. Fig. 27 is a plan view of the type-case, keyboard, and escapements. Fig. 28 is an enlarged broken sectional view taken on line 28 of Fig. 27. Fig. 29 is an elevation taken on line 29 of Fig. 28. Fig. 30 is a broken sectional view taken on line 30 of Fig. 29. Fig. 31 is a perspective view of one of the type. Fig. 32 is a perspective view of a holder for the type. Fig. 33 is a perspective view of the type-holder casing. Fig. 34 is an enlarged plan section taken on line 34 of Figs. 28 and 29. Fig. 35 is a front sectional elevation taken on line 35 of Fig. 34. Fig. 36 is a view similar to Fig. 17, with certain parts omitted and certain other parts shown which are omitted from Fig. 17. Fig. 37 is an enlarged sectional elevation taken on line 37 of Figs. 27, 36, and 46. Fig. 38 is an enlarged broken plan sectional view taken on line 38 of Fig. 36. Fig. 39 is a broken plan sectional view taken on line 39 of Fig. 37. Figs. 40 and 41 are broken vertical sectional views taken on lines 40 and 41 of Fig. 39. Fig. 42 is a plan sectional view taken on line 42 of Fig. 37. Fig. 43 is a broken sectional view taken on line 43 of Figs. 36 and 46. Fig. 44 is a sectional elevation taken on line 44 of Fig. 43. Fig. 45 is a perspective view of a detail. Fig. 46 is a plan sectional view taken on line 46 of Figs. 2, 5, 36, 37, and 43. Fig. 47 is a broken plan sectional view of the type-holder-actuating mechanism. Figs. 48 and 49 are sectional elevations taken on lines 48 and 49 of Fig. 47. Figs. 50 and 51 are enlarged sectional elevations taken on lines 50 and 51 of Fig. 47. Figs. 52 to 56 are details of the type-holder-operating mechanism. Figs. 57, 58, and 59 are detail perspective views of the spacer-key and its connections. Fig. 60 is a sectional elevation of the registering device taken on line 60 of Fig. 61. Fig. 61 is a plan sectional view taken on line 61 of Fig. 60. Fig. 62 is a diagrammatic view with the platen in its extreme outer position. Fig. 63 is an enlarged vertical section of the pump taken on line 63 of Fig. 1. Fig. 64 is an enlarged sectional view of the reservoir and relief-valve taken on line 64 of Fig. 1, and Fig. 65 is a plan sectional view taken on line 65 of Fig. 3.

Referring to Figs. 1, 2, and 3, $a$ is a baseplate, upon which are mounted the side frames $b\ b'$. Mounted in the side frames is the main power-shaft $c$, carrying at one end a fly-wheel $d$. This shaft is connected by any suitable means—such as a belt $e$ and pulley $f$, as shown—to a suitable motor $g$. Mounted between the side frames above the main shaft is a second or transmission shaft $c'$, geared to the main shaft by gear-wheels $h\ h'$. Above this second shaft is a third or operating shaft $c^2$, geared to the transmission-shaft by gear-wheels $h^3\ h^3$, the gear-wheel $h^2$ being loosely mounted on the transmission shaft and the gear-wheel $h^3$ being at the end of the operating-shaft, the other end of this shaft being provided with a disk $i$. Pivotally mounted upon the front of the side frames at the lower end thereof is a yoke $k\ k$, the pivots of which are at $k'\ k'$ near the base-plate. This yoke carries at its upper end a platen $a'$. The connecting-rods $l\ l$, journaled to the yoke at $m$, connect the yoke to the disk $i$ and gear-wheel $h^3$ through the crank-pins $m'$. The motor and main power-shaft of the machine are constantly operating. It is necessary, however, to provide for an intermittent operation of the yoke and platen and other parts. For this purpose there is mounted on the transmission-shaft $c'$ a clutch composed of two members $n\ n'$, $n'$ being a sliding member on the shaft and $n$ a fixed member on the gear-wheel $h^2$. This clutch is shown in Fig. 3. The member $n$ of this clutch has pivoted at $n^2$ one arm of a three-armed lever $o$. This lever is keyed to a short shaft $p$, mounted in a suitable bearing $p'$, carried by the frame of the machine. This bearing is clearly shown in Figs. 4, 5, 36, and 46. On the side frame at $q'$ is pivoted the rocking foot-lever $q$, the inner end $q^2$ of which is connected to one of the arms of the three-armed lever by a connecting-rod $q^3$. The third arm of this three-armed lever is connected by a pin-and-slot connection $q^4$ with a locking-pin $q^5$, mounted to slide through an opening in the side frame. The inner side of the gear-wheel $h^3$ is provided, as shown in Fig. 6, with a bearing-face $h^4$, and at one point in this bearing-face is a hole or recess $h^5$. The connecting-rod $q^3$ passes through an eye $q^6$, mounted on the side frame, and between this eye and the lower end of the foot-lever a spring $q^7$ is mounted upon the rod. The tendency of this spring is to force the inner end of the foot-lever downward, thus releasing the clutch and forcing the locking-pin into engagement with the hole in the gear-wheel. It will be seen that this locking-pin not only serves to stop the motion of the gear-wheel after one complete revolution, but also to hold the clutch members in engagement during this revolution, because after the pin has been retracted by the movement of the foot-lever and is resting against the bearing-face of the gear-wheel the spring cannot force the connecting-rod down to operate the three-armed lever.

Referring now to Figs. 9 to 16, inclusive, and Fig. 62, $a'$ is a platen-frame rigidly secured to a shaft $a^2$, journaled in the upper ends of the yoke. The yoke is connected near its upper ends by an L-shaped brace $a^3$, carrying a set-screw $a^4$, which may be adjusted and held in adjusted position by a jam-nut $a^5$, so as to limit the movement of the platen-frame. Secured to one end of the platen-frame shaft is a collar $a^6$, having spaced lugs or ears $a^7$, between which ears is pivoted at $a^8$ one end of a connecting-rod $a^9$. The other end of this rod passes through an eye $a^{10}$, pivotally mounted on the end of a bracket $a^{11}$. The other end of this bracket is rigidly secured to the side frames by bolts $a^{12}$. Surrounding the rod between the eye and the point of connection with the platen-frame journal is a stiff spring $a^{14}$, which may be adjusted by jam-nuts $a^{13}$. It will be seen that by means of these connections the platen-frame when swung from its inner to its outer position is caused to turn from a vertical to a substantially horizontal plane, as shown in Fig. 62. The spring is so adjusted as to prevent the rod from sliding through the eye, thus compelling the platen-frame to turn on its shaft. At the same time this spring provides a cushion connection between the platen-frame and the supporting-frame, thus making it possible to adjust the pressure so as to do away with the necessity for "make-ready." Journaled at the lower edge of the platen-frame is a shaft $a^{15}$, upon which are mounted parallel fingers $a^{16}$. At one end of the shaft is a short projection or ear $a^{17}$, to which is pivoted a connecting-rod $a^{18}$. The other end of this rod passes through an eye $a^{19}$, swiveled upon the yoke. Surrounding this rod is the spring $a^{20}$, adjustable by the jam-nuts $a^{21}$. The purpose of these connnections is to cause the fingers to be raised away from the platen when the platen-frame is in its outer position, so that the paper may be easily inserted.

Referring now to Figs. 11 to 16, inclusive, the platen-frame $a'$ comprises a base-plate $a^{22}$, side flanges $a^{23}$, and a bottom flange $a^{24}$. The base-plate is slightly inclined, as shown in Fig. 11, for a purpose presently to be described. The platen proper is composed of two parts. One of these, the block $a^{25}$, (shown in Figs. 11 and 12,) is secured to the corner of the base-plate by screws $a^{26}$. The other part of the platen is movable and comprises a holder $a^{27}$, (shown in Figs. 13 and 14,) cut away at one corner to provide a space for the fixed portion and provided at its ends with journals $a^{28}$, adapted to be mounted in slots $a^{29}$ in the sides of the platen-frame. This holder is provided with recessed cleats $a^{30}$ and $a^{31}$ along its lower and upper edges, respectively, which serve to retain the platen $a^{32}$ in the holder. The platen $a^{32}$ is also cut away at one corner to form a space for the fixed portion. The platen-holder and the fixed portion of the platen, as shown in Figs. 11 and 12, are slightly wedge-shaped.

Referring now to Fig. 2, $a^{33}$ is a bell-crank lever, fixed upon a shaft $a^{36}$ in the platen-frame and connected by a link $a^{34}$ with one of the journals of the platen-holder. The other journal is similarly connected to an arm on the opposite end of the shaft. The other end of this lever is provided with a handle $a^{35}$. It will be seen that by pulling the handle forward the bell-crank will raise the movable platen-section to the position indicated in dotted lines in Fig. 12. Owing to the wedge-shape of the platen-holder this upward movement will cause the surface of the movable section to be slightly depressed below that of the fixed portion. The purpose of this will be explained later. Connecting the upper ends of the side frames is a flanged plate $d'$, which is bolted to the side frames. The vertical front portion $d^2$ of this plate is cut away at one corner, as shown in Fig. 36. In the cut-away portion there is slidably mounted a second plate $d^3$, which plate is connected by a lug on its rear side to a crank on the short shaft $p$. It will thus be seen that when the foot-lever $q$ is depressed to start the operation of the press the plate $d^3$ will be thrown to its innermost position behind the type-stick, forming a bed therefor. These plates constitute the form-bed for the electrotype containing the body of the letter to be printed, the position of which is indicated in dotted lines in Fig. 36. In front of the bed and mounted upon spools carried by the side frame is a carbon ribbon by means of which the impression is made, as will be readily understood. The mechanism for operating this ribbon will be hereinafter described.

As has been before stated, one of the objects of my invention is to produce an imitation type-written letter in which the address and body of the letter shall appear in the same style and color. It is of course to be understood that the address must be changed as each letter is printed. The means for doing this will now be described.

Mounted near one end of a short shaft $g'$ is a head-block $g^{34}$, having a flat face, upon which are mounted two parallel rows of rods $g^2$, spaced apart, as shown. (See Figs. 38 and 43.) In the present instance there are four rods in each row. These rods constitute what will be designated as the "type-stick," and are adapted to receive and hold the types. (Shown in detail in Fig. 31.) These types are provided with semicircular notches in their sides, by means of which they are retained by the type-stick and are conveyed to such type-stick through the channel $r$. (See Figs. 37 and 38.) When receiving type, the type-stick is turned to horizontal position, as shown in Figs. 38 and 43, and the type falling through the channel is brought to a position opposite the space between two of the rows of rods. It is then forced into position by a reciprocating block $g^{20}$, which, for reasons which will hereinafter appear, will be designated a "kicker."

By reference to Fig. 38 it will be observed that the four rows of rods provide three rows of spaces for type, thus enabling the operator to set up an address of three lines. It is of course necessary that the type-stick should be moved when one line is complete, so that the next type-space will be brought into position to receive type. In order to accomplish this result, as well as others to be mentioned, the following mechanism is provided: The shaft $g'$ is mounted to slide in its bearing $g^3$.

This shaft is provided at one end with a collar $g^4$, having gear-teeth $g^5$ around a part of its circumference. Upon this collar at its inner end is mounted a collar $g^6$, provided with detent-teeth $g^7$, engaged by a spring-pressed pin $g^8$. This latter collar is of segmental shape, as shown in Fig. 41. Upon the collar $g^4$ and spaced from the collar $g^6$ is a second collar $g^8$, held on the end of the first collar by a washer $g^9$. It will be observed that the gear-teeth on the collar $g^4$ are located between the collars $g^6$ and $g^8$. In the side frame of the machine a rod $g^{10}$ is mounted for both pivotal and vertical sliding movements. At its lower end this rod is provided with a head $g^{11}$, as shown in Figs. 37 and 40, having teeth $g^{12}$, which engage the teeth on the segmental collar of shaft $g'$. This head is elongated and the teeth $g^{12}$ are cut in a wedge-shaped projection $g^{13}$, which enters the space between the collars $g^6$ and $g^8$. To the upper end of the rod $g^{10}$ is pivoted a lever $g^{14}$, having at its outer end a handle $g^{15}$. The inner end of this lever rests in a segmental guide $g^{16}$, suitably attached to the top of the side frame, as shown in Figs. 37 and 42. In front of the lever-pivot in the frame of the machine is a second segmental guide, through which the lever passes. This guide is provided with an elongated horizontal slot $g^{17}$, a series of vertical notches $g^{18}$ on the lower edge of this slot, and a single vertical notch $g^{19}$ on the upper edge thereof. Mounted upon the plate $d'$ at the point where the types are delivered to the type-stick is the reciprocating kicker $g^{20}$ before referred to, which is shown clearly in Fig. 43. This kicker is provided at one end with a head $g^{21}$ for engaging the type, and at its opposite end with a slot $g^{22}$, engaging one end of a bell-crank lever $g^{23}$, mounted upon a short shaft $g^{24}$. This shaft is journaled in suitable bearings in the plates $g^{25}$, attached to the flanged plate $d'$.

In order to provide a flexible connection between the bell-crank lever and the kicker, the end of the lever at its point of connection with the kicker is provided with a roller $g^{26}$, and a spring $g^{27}$, secured to the arm of the lever by screws $g^{28}$, bears against this roller. A spring $g^{29}$, around the pivot of the bell-crank, bears against the other arm of the bell-crank, keeping it in engagement with a cam $g^{31}$. The engagement between the bell-crank and the cam is through the roller $g^{30}$, mounted upon the arm of the bell-crank. The cam $g^{31}$ is mounted upon the short shaft $g^{32}$, journaled between the plates $g^{25}$ below the bell-crank shaft. Upon the end of the cam-shaft is mounted a pulley $g^{33}$, which is suitably connected to a pulley $g^{34}$ upon the main operating-shaft.

The operation of type-setting may now be understood. When it is desired to set up an address on the type-stick, the latter is brought to horizontal position by depressing the lever $g^{14}$. This forces the rod $g^{10}$ downward, and, through its geared connection with the collar $g^4$, carries the type-stick to horizontal position, as shown in Fig. 43. The type falls through the channel $r$ to a point adjacent the ends of the type-stick. It will be understood that by reason of the connection between the main operating-shaft and the cam-shaft the kicker $g^{20}$ is constantly vibrating, so that as a type is brought into position to be delivered to the type-stick it is forced thereon by the kicker. If for any reason the type should become jammed at this point, no harm will be done, because of the slotted cushioned connection between the kicker and the bell-crank lever. When the first line of the address has been set up, the operator by swinging the lever $g^{14}$ from the first notch in the slotted guide to the second notch, will advance the type-stick one space by the rotation of the head $g^{13}$. When the address has been completed, the lever $g^{15}$ is swung to its uppermost position, as shown in dotted lines in Fig. 37, being retained in the notch $g^{19}$. The foot-lever, being depressed to start the operation of the machine, throws the movable form bed-section $d^3$ into position behind the type to form a backing for it. After a letter has been printed and it is desired to change the address the operator by depressing the lever $g^{14}$ to a position below the horizontal will cause the type-stick to take a corresponding position below the horizontal, and the type will be caused to run off the rods and conveyed away through the chute $g^{35}$.

Secured to the front of each of the side frames is a guide $e^3$, carrying a slide-block $e^2$, constituting a spool-holder, as shown in Figs. 19 and 20. This slide-block has upper and lower bearings $e^{11}$ and $e^{12}$, respectively, (shown in Figs. 20 and 21,) furnishing bearings for the ribbon-spools $e'$ $e'$ and the spindles $e^{13}$ and $e^{14}$. The purpose of these guide-spindles is to keep the ribbon always in the same plane, as shown in Fig. 26. The ribbon-spools are detachably held in the lower bearings by the spring-pressed pin $e^{23}$. The upper bearing $e^{15}$ terminates in a trunnion, as shown in Fig. 22, and this trunnion carries a ring $e^{16}$, having a laterally-projecting arm $e^{17}$. Fastened to the side frames adjacent the upper ends of the guides are cam-tracks $e^{18}$, against which the outer end of the laterally-projecting arms bear. Above the trunnion and ring a ratchet-wheel $e^{20}$ is secured to the spindle of the spool, and this ratchet-wheel is held in position by a four-armed spring $e^{22}$. Mounted upon the laterally-projecting arm is a spring-pressed pawl $e^{21}$, having its spring-pressed end squared, so as to be held either in or out of engagement with the ratchet-teeth. The upper bearing is provided on its lower face with a rubber covering $e^{25}$, which provides a frictional engagement between the bearing and the cap $e^{26}$ of the spool. This cap is shown in Fig. 24 and is provided with a projection $e^{27}$, adapted to enter a corresponding slot $e^{29}$ in the ferrule $e^{28}$, attached to the end of the ribbon-spool. The slide-blocks $e^2$ are connected by links $e^4$ with a crank-shaft $e^5$ on the rock-shaft $e^6$, journaled in the side frames. This rock-shaft is connected to the yoke by a crank $e^7$ and link $e^8$. It will be observed that as the yoke moves inward and outward it causes the slide-blocks, carrying the ribbon-spools to move vertically up or down. As the slide-blocks travel upward the laterally-projecting arm on the upper bearing travels along the cam-guide $e^{18}$, thus advancing the ratchet-wheel $e^{20}$, through the pawl $e^{21}$, a predetermined number of spaces. The effect of this is to wind up a portion of the ribbon on the spool, thus changing the printing-surface. During the movement of the slide-blocks the four-armed spring holds the upper bearing firmly against the ribbon-spool, thus preventing any accidental movement thereon.

It will be observed that the direction of travel of the ribbon depends upon the pawl which is in engagement with the ratchet-wheel. It is to be understood that when the pawl on one spool is in engagement with its ratchet the pawl on the other rod is thrown out of engagement. By varying the arrangement the ribbon may be caused to travel in the opposite direction.

An inclined type-case $s$ is mounted upon standards $s'$, secured to the top of the side frames. This casing has a series of compartments, one for each character. The types, which are of the shape already described, move downward by gravity into a reciprocating holder $s^2$, as shown in Fig. 28. This type-holder is rectangular in shape, as shown in Fig. 32, and has upon its interior side walls semicircular lugs corresponding in size and position to the semicircular recesses in the side of the type. The holders $s^2$ are mounted in a casing $s^4$, (shown in Fig. 33,) which casing is recessed at its rear side to receive the type-holder, as shown in Fig. 34. In the front of the recessed portion the casing is provided upon its interior side walls with semicircular lugs $s^6$, corresponding in shape and position to the notches in the type.

Normally the type-holder, with the type contained therein, is held in slightly-raised position, so that its opening is not in register with that of the casing. This result is effected by a lever $s^7$, pivoted at $s^8$ to the type-case. One end $s^9$ of this lever is pivotally connected to the sliding type-holder. The other end $s^{10}$ is connected to an operating-rod $s^{11}$, which is connected to the piston $s^{12}$ of a pneumatic $s^{13}$. It is of course to be understood that there are as many of these mechanisms as there are divisions in the type-case. In the present machine sixty-five are shown. One of the pneumatics is shown in section in Fig. 28. It is composed of two parts—the piston $s^{12}$ and a cylinder $s^{14}$, normally held up by a spring $s^{15}$. When the lever $s^7$ is depressed, it causes the opening in the type-holder to register with that in the holder-casing, and a type is permitted to drop into the upper part of one of the converging channels $r'$, of which there is one for each section of the type-case. (See Fig. 4.) In front of each casing is a glass window $r^3$, as shown in Figs. 28 to 30. The type is thence conveyed to the channel $r$ and set up, as before described. It is to be observed that the pneumatics are contained within a casing which is below and in front of the type-case.

Located in front of the pneumatics-casing is a casing $t$, containing a valve-chest $t'$. In the upper face of this casing are mounted keys $t^{25}$, corresponding in number with the number of compartments in the type-case. These keys are of any approved construction. The valve-chest within the casing is composed of a number of sections $t^2$. (Shown in detail in Figs. 53 to 56, inclusive.) These sections, which are similar in construction, are connected together by suitable fastenings $t^3$, as shown in Figs. 50 and 51. Each of these sections comprises a series of valve-casings $t^4$, each containing a valve $t^{10}$, circumferentially recessed to provide a valve-chamber $t^9$. Each valve-chamber is provided with a port $t^5$, communicating with the air, and a port $t^6$, communicating with the common chamber of the valve-chest hereinafter described. Each valve-case has also a passage $t^7$ and a port $t^8$, connecting this passage with the valve-chamber. The valve is normally held upward by a spring $t^{11}$. This spring is supported on a screw $t^{12}$, having a passage $t^{13}$ to the air, the purpose of this being to permit the easy operation of the keys. The passages $t^7$ are connected by pipes $t^{14}$ to the pneumatics, which operate the type-releasing levers. It will be observed that the valve-chest sections when secured together form a common chamber in which are the valve-casings. The ends of this chamber are closed by upper and lower plates $t^{15}$ and $t^{16}$. Each valve is connected through its stem to one of the keys. The pipe $t^{17}$ leads from the common chamber of the valve-chest to a reservoir $t^{18}$, supported upon the side frame. This reservoir is connected by a pipe $t^{19}$ to a suitable air-pump $t^{20}$, which in turn is connected by a connecting-rod $t^{21}$ to a crank $t^{22}$ upon the end of the constantly-rotating shaft $c'$. The pump keeps the reservoir, and consequently the common chamber, exhausted of air at all times.

Referring now to Figs. 28 and 50, it will be observed that the keys are normally held in their upper position by the springs. When in this position, there is direct communication from the air to the pneumatics through the ports $t^5$, the valve-chamber, the port $t^6$, the passage $t^7$, and the pipes $t^{14}$. When a key is depressed the port $t^5$ is closed, and the port $t^6$ between the common chamber and the valve is opened, thus opening communication between the pneumatics and the common chamber. The result of this is that the air is exhausted from the pneumatic, the piston depressed, carrying with it the operating-rod $s^{11}$, and consequently operating the lever $s^7$ to move the type-holder into register with its casing. The type consequently falls out through the casing into a channel $r'$, by which it is conveyed to channel $r$. The front of the type-case is formed by glass windows $r^3$, through which the type may be observed. The channel-plate is also backed with a glass plate $r^4$, secured to the plate by thumb-screws $r^5$.

As shown in Fig. 50, each valve-stem is provided with a collar $v$, which serves to limit the upward movement of the key. Journaled in the sides of the valve-chest casing are parallel rock-shafts $v'$, one for each row of keys. A series of crank-arms $v^2$ is secured to each rock-shaft by a collar and set-screw, as shown in Figs. 47 and 50, there being one of these arms for each key. These crank-arms bear against the under side of the collars on the valve-stems and are held normally in upturned position by springs $v^3$ around one end of the rock-shafts, these springs being secured to the valve-casing and also bearing against the crank-arms. The ends of the rock-shafts on the opposite side of the casing are provided with depending arms $v^5$, having pins or studs which enter elongated slots $v^7$ in a slide-bar $v^6$, the slide-bar being thus supported on the pins or studs. It will be seen that when one of the keys is depressed one of the rock-shafts will be turned and the sliding bar moved correspondingly by means of the crank mechanisms.

In addition to the character-keys I have provided two space-keys $x$ (see Figs. 27, 48, and 50) adjacent to the lowermost row of character-keys. By reference to Fig. 27 it will be observed that the end character-keys are omitted, and in place thereof are shown plungers $x'$ $x^3$, which are connected to valves and pneumatics similar to those already described. These plungers are so connected to the spacer-keys $x$ that when the spacer-key is depressed the plungers are also depressed to operate their corresponding pneumatics. By reference to Fig. 57 it will be observed that the rock-shaft $v'$ adjacent to the plunger is provided with an elongated collar $v^{13}$, which is loose on its shaft. At one end of this collar is an arm $v^{12}$, which engages with a stud $v^{16}$ on the bell-crank $v^{15}$, secured to the shaft. Another arm $v^{11}$ on the collar is connected to an arm $v^{10}$, suitably secured to the rock-shaft $v^8$. An arm $v^{14}$ on the loose collar bears against a collar $v^{18}$ on the plunger $x^8$. At the right-hand side of the casing is shown a plunger $x^3$, having a collar $x^4$. (See Figs. 47 and 53.) On the upper surface of this collar an arm $x^5$, rigidly secured to the adjacent rock-shaft, bears. It will now be seen that whenever a character-key is depressed it will through its collar and connections with an adjacent rock-shaft cause the rock-shaft to turn. This will operate the slide-bar $v^6$ in a direction indicated by the arrow in Fig. 49, causing the bell-crank and its shaft to turn. Whenever this shaft turns, it will through the arm $x^5$ and collar $x^4$ depress the plunger $x^3$. It will be observed also that whenever either of the space-keys is operated it will through the connection $v^{21}$ cause the loose collar to turn, thus depressing the plunger $x^8$ through the arm $v^{14}$ and collar $v^{18}$. The turning of this loose collar will also cause the bell-crank to turn, this also operating the plunger $x^3$ as well as the plunger $x^8$. It will be seen, therefore, that whenever a character-key is depressed it results in a depression of the plunger $x^3$, and that whenever the space-key is depressed it results in the depression of both plungers $x'$ and $x^3$.

Connected to the plunger $x^3$ is a registering device which is attached to the front of the pneumatics-casing, while the plunger $x'$ operates through its valve and the pneumatic connected thereto to release a slug from the type-casing, thus providing for the proper spacing in the matter being set up. The register pneumatic is connected by a pipe to the plunger-valve $x^3$ in the valve-chest. As this plunger is operated every time a character or space key is depressed, it will be seen that the register is operated by every key on the keyboard.

The registering device is shown in detail in Fig. 60. It consists of a space-bar $y$, having space-marks thereon and a pointer $y^2$, mounted upon one end of a sliding ratchet-bar. Adjacent the sliding ratchet-bar is pivoted a lever $y^3$, pressed toward the ratchet-bar by a spring $y^4$, its normal movement being limited by a stop $y^5$. Mounted upon this lever is a spring-pressed detent-pawl $y^6$, which engages the teeth of the ratchet-bar to hold it in position. Pivoted also on the lever $y^3$ is a lever $y^7$, carrying a spring-pressed operating-pawl, also engaging the teeth of the ratchet-bar. The lever $y^7$ is connected by a link $y^9$ to the piston of the pneumatic $x^2$. It will be seen that when the pneumatic is operated and its piston depressed the movement of the lever $y^7$ will cause the operating-pawl to move the ratchet-bar one step, and it will be held in its new position by the detent-pawl. When it is desired to return the ratchet-bar to its original position, the lever $y^3$, carrying with it the dogs, is swung away from the ratchet-bar, which is thus allowed to drop to the position shown in Fig. 60.

The operation of the press will now be clearly understood. Assuming that the platen-yoke is swung to its outer position, as shown in Fig. 62, ready to receive a sheet of paper, the form-bed sections are then separated, permitting the passage therethrough of the type-stick, the type-stick being turned to horizontal position by depressing its operating-lever to type-setting position, as indicated in Fig. 37. The operator sets up an address by depressing the proper keys on the keyboard, thus opening communication between the exhausted chamber and the proper pneumatics and releasing the type, which are conveyed through the channels $r'$ and $r$ to a point opposite the ends of the rods on the type-stick. The type are driven into position on the type-stick by the constantly reciprocating kicker, which is operated by belt and pulley connections with the main shaft. The address having been set up, the type-stick is turned to printing position by releasing its operating-lever to the position shown in Fig. 37. The foot-lever is then depressed, thus connecting the two clutch connections on the transmission-shaft and at the same time withdrawing the locking-pin from the gear-wheel on the operating-shaft. This causes the operating-shaft to turn, drawing the platen-yoke and the platen thereon against the form-bed. As the platen-carrying yoke swings toward the form-bed it causes the ribbon-carriers to move vertically from their lowermost position to a position in front of the form-bed, as shown in Fig. 17. An impression is then taken from the ribbon, as it will be seen that as the address and body of the letter are printed from the same ribbon they will appear in the same style and color on the printed sheet. At the same time that the clutch is thrown into operation and the locking-pin released the movable section of the form-bed is carried into position behind the type-stick, forming a support therefor. When it is desired to print addresses only upon letters after the main body of the letter has been already printed, the movable section of the platen will be depressed, as has been before described. The printed portion of the letter will then be so placed on the platen as to be adjacent the slightly-depressed portion, while the part upon which the address is to be printed will rest against the fixed portion of the platen. When the impression is made, owing to the depression of the movable section of the platen, no pressure will be brought against this part, but the address only will be printed. By the continued rotation of the operating-shaft the platen-yoke is carried to its outer position. During the rotation of the operating-shaft the locking-pin bears against the inner face of the gear-wheel on the operating-shaft and is held, therefore, in its released position. Through its connection with the three-armed lever the pin holds the clutch members in engagement and also holds the foot-lever in its depressed position against the force of the spring on the connecting-rod. At the completion of one revolution of the operating-shaft the hole or recess in the gear-wheel reaches a position opposite the locking-pin, which immediately enters this recess, being forced therein by the spring on the connecting-rod. At the same time the clutch members are released, thus stopping the operation of the press and at the same time the form-bed sections are separated. The type-stick may then be depressed to its lowermost position and the type spilled, as before described. The press is then ready for a new operation.

It will of course be understood that I do not intend to limit myself to the specific details of construction herein described, but may make such changes and variations as will readily suggest themselves to one skilled in the art.

I claim—

1. In combination with a printing-press, a type-case, pneumatically-operated means for releasing type from the type-case and means for conveying the type to the form-bed of the press.

2. In a printing-press, a form-bed comprising a permanent form-carrying section and a variable form-carrying section, in combination with means for setting type in the variable form-carrying section, and means for removing the type therefrom.

3. A printing-press comprising a type-case, a sectional form-bed, a type-stick mounted thereon, pneumatically-operated means for releasing type from the type-case and means for conveying the type to the type-stick.

4. In a printing-press, a sectional form-bed, a swinging type-stick mounted adjacent to the form-bed, means for separating the form-bed sections to permit the passage of the type-stick therethrough.

5. In combination with a printing-press, a type-case, a sectional form-bed, a swinging type-stick mounted adjacent to the form-bed, means for separating the form-bed sections, and means for delivering type to the type-stick.

6. In a printing-press, a form-bed having a recessed fixed section, a movable section mounted to slide in the recessed fixed section, and a movable type-stick adapted to be supported by the movable section.

7. In combination with a printing-press, a type-stick having a head-block and rows of spaced parallel rods mounted thereon.

8. In a printing-press, the combination of an inclined type-case, a type-holder at the lower end thereof having an opening corresponding in size and form with the type, a casing in which the holder is mounted to slide having a similar opening normally out of register with that in the holder, and means for bringing the openings in the holder and its casing into register to permit the passage of type.

9. In a printing-press, the combination of an inclined type-case, a reciprocatory type-holder having a type-opening therethrough, a casing for the holder having a similar opening—the openings being normally out of register, a lever pivoted to the case and to the holder, and means for operating the lever to bring the openings into register.

10. In a printing-press, a sectional form-bed, a shaft journaled therein, a type-stick on said shaft, and means for turning the shaft to swing the type-stick into receiving, holding or spilling position.

11. In a printing-press, a sectional form-bed, a shaft journaled therein, a type-stick on said shaft, a rod mounted in the form-bed for vertical and pivotal movement, said rod being geared to the type-shaft, and means for operating the rod.

12. In a printing-press, a sectional form-bed, a shaft journaled therein, a type-stick on said shaft, a rod mounted in the form-bed for vertical and pivotal movement, said rod being geared to the type-stick shaft, means for operating the rod to turn the type-stick into receiving, holding or spilling position, and guides for the rod-operating means.

13. In a printing-press, a sectional form-bed, a swinging type-stick adapted to pass between the form-bed sections, means for delivering type to a point adjacent the type-stick, and means for driving the type into position on the type-stick.

14. In a printing-press, a type-stick, means for moving the type-stick to receiving and to printing positions, means for delivering type to a point adjacent to the type-stick when in receiving position, and means for driving type into position on the type-stick.

15. In a printing-press, a sectional form-bed, a sliding shaft journaled therein, a type-stick on the shaft, and means for advancing the shaft to bring different spaces of the type-stick into type-receiving position.

16. In a printing-press, a type-stick, means for moving the type-stick to type-receiving and to printing positions, means for delivering type to a point adjacent to the type-stick when the latter is in receiving position, and reciprocating means for driving the type into position on the type-stick.

17. In a printing-press, a type-stick, means for moving the type-stick to type-receiving and to printing positions, means for delivering type to a point adjacent the type-stick when the latter is in receiving position, a reciprocating block or kicker for driving the type into position on the type-stick, and means flexibly connected to the block for operating the same.

18. In a printing-press, a form-bed, supports therefor, guides upon the supports, ribbon-spool holders carrying a ribbon mounted in the guides, and means for reciprocating the ribbon-spool holders to carry the ribbon into and out of printing position.

19. In a printing-press, a form-bed, supports therefor, ribbon spool-holders mounted for sliding movement on the supports, and means on the supports for causing a partial rotation of the ribbon-spools during each movement of the spool-holders.

20. In a printing-press, a form-bed, supports therefor, a swinging platen-yoke, ribbon-spool holders mounted for sliding movement on the form-bed supports, and connections between the holders and the yoke, whereby the holders are operated by the movement of the yoke to carry the ribbon into and out of printing position.

21. In a printing-press, the combination of a ribbon-spool holder carrying a spool, guides wherein the spool-holder is mounted for sliding movement, an arm trunnioned upon the spool, and a cam-track on the guides against which the end of the arm bears during the movement of the spool-holder.

22. In a printing-press, a slide-block having upper and lower bearings, a ribbon-spool mounted in the bearings, means for detachably holding the spool in the lower bearing, means for turning the spool, and a frictional contact device between the spool and its upper bearing.

23. In a printing-press, a slide-block having upper and lower bearings, a ribbon-spool detachably supported in the lower bearing and having frictional engagement with the upper bearing, a trunnion on the upper bearing, an arm carrying a spring-pressed pawl on said trunnion, and a ratchet-wheel on the trunnion engaged by said pawl.

24. In a printing-press, a platen-frame, a platen comprising fixed and movable sections mounted therein, and means for depressing the movable section below the plane of the fixed section.

25. In a printing-press, a platen-frame having slotted sides and an inclined base-plate, a platen mounted therein consisting of a fixed section and a movable section, the movable section comprising a movable wedge-shaped holder having journals entering the slotted sides and recessed to receive the platen proper, and means for moving the holder.

26. In a printing-press, a platen-holder having a wedge-shaped recess, a wedge-shaped platen therein comprising fixed and movable sections, and means for actuating the movable section to depress it below the plane of the fixed section.

27. In a printing-press, a type-case, means for releasing type from the case, means for operating the releasing means comprising a series of pneumatics, and key-operated mechanism for exhausting air from the pneumatics.

28. In a printing-press, a type-case, means for releasing type from the case, a series of pneumatics connected to the releasing means, a valve-chest comprising a common chamber normally exhausted of air, and a series of valve-casings, each having a port-opening into the atmosphere, a port opening into the common chamber, and a port connected to one of the pneumatics, and a valve in each valve-casing, whereby a communication may be established between a pneumatic and the common chamber.

29. In combination, a valve-chest provided with a series of valves, a registering device, and a pneumatic for operating the registering device and connection between the valves and the pneumatic, whereby the register is operated by each of the valves.

30. A valve-casing having a series of valves mounted therein, a series of rock-shafts journaled in the casing, means for operating the rock-shafts by the movement of the valves, a sliding bar operatively connected with a rock-shaft, a registering device, and means connecting the registering device and sliding bar, whereby the register is operated by the movement of the bar.

31. In a printing-press, a supporting-frame, a swinging platen-yoke, a ribbon-carrier mounted for vertical movement on the frame, a rock-shaft having a crank-arm connected to the ribbon-carrier, and also a crank-arm connected to the platen-yoke, whereby the ribbon-carrier is operated by the movement of the yoke.

32. In a printing-press, a supporting-frame, a swinging yoke, means for operating the swinging yoke, a platen-frame jornaled in the yoke adapted to turn to paper receiving or printing position, a bracket rigidly secured to the supporting-frame, an eye swiveled on the bracket, a collar having an arm secured to the platen-frame journal, a connecting-rod pivoted to the arm and passing through the eye on the bracket, a spring surrounding the rod between its pivot and the eye, and means for adjusting the spring.

33. In a printing-press, a swinging yoke, a platen-frame journaled therein adapted to turn to paper-receiving or printing position, a rock-shaft mounted in the platen-frame, paper-holding fingers attached to the rock-shaft, a crank-arm projecting from the rock-shaft, and cushioned connections between the crank-arm and yoke.

34. In a printing-press, a swinging platen-carrying yoke, operating mechanism therefor, means for throwing this mechanism out of operation, means for locking the operating mechanism in inoperative position a sectional form-bed, connections between a section of the form-bed and the locking means, whereby the form-bed connections are brought into operative relation when the locking means is released.

35. Typesetting mechanism comprising a valve-chest, a series of key-operated valves and two plunger-operated valves, a register operated by one of the plunger-operated valves, and means connecting the other plunger-operated valve and each of the key-operated valves with the register-operating plunger-valve, whereby the register may be operated by any of the valves.

BYRON B. CARTER.

Witnesses:
H. M. VAN STOESEN,
ANNA L. SAVOIE.